US012666286B2

(12) United States Patent (10) Patent No.: US 12,666,286 B2

Venugopal et al. (45) Date of Patent: Jun. 23, 2026

(54) TECHNIQUES FOR CHANNEL QUALITY INFORMATION REPORTING

(71) Applicant: QUALCOMM Incorporated, San Diego, CA (US)

(72) Inventors: Kiran Venugopal, Green Brook, NJ (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 18/166,392

(22) Filed: Feb. 8, 2023

(65) Prior Publication Data

US 2024/0267766 A1 Aug. 8, 2024

(51) Int. Cl.
H04W 24/08 (2009.01)
H04L 5/00 (2006.01)
H04W 24/10 (2009.01)

(52) U.S. Cl.
CPC ........... H04W 24/08 (2013.01); H04L 5/0051 (2013.01); H04L 5/0057 (2013.01); H04W 24/10 (2013.01)

(58) Field of Classification Search
CPC .... H04W 24/08; H04W 24/10; H04L 5/0051; H04L 5/0057; H04L 1/0026; H04B 7/0478; H04B 7/0639; H04B 7/0641; H04B 7/0663; H04B 7/0632
See application file for complete search history.

(56) References Cited

U.S. PATENT DOCUMENTS

| | | | |
|---|---|---|---|
| 2017/0264405 A1* | 9/2017 | Gao | ........................ G16H 20/10 |
| 2018/0212660 A1* | 7/2018 | Gao | ..................... H04B 7/0626 |
| 2019/0053072 A1* | 2/2019 | Kundargi | .............. H04W 16/28 |
| 2019/0109626 A1 | 4/2019 | Park et al. | |
| 2020/0322022 A1* | 10/2020 | Gao | ..................... H04B 7/0619 |
| 2021/0143885 A1 | 5/2021 | Grossmann et al. | |
| 2022/0006496 A1* | 1/2022 | Park | ........................ H04L 5/005 |
| 2022/0417778 A1* | 12/2022 | Rahman | ................ H04W 24/08 |
| 2023/0171623 A1* | 6/2023 | Zeineddine | ........... H04L 5/0057 |
| | | | 370/252 |

OTHER PUBLICATIONS

International Search Report and Written Opinion—PCT/US2024/011542—ISA/EPO—May 16, 2024 (2301395WO).

* cited by examiner

*Primary Examiner* — Steven Hieu D Nguyen
(74) *Attorney, Agent, or Firm* — QUALCOMM Incorporated

(57) ABSTRACT

Methods, systems, and devices for wireless communications are described. A user equipment (UE) may receive control signaling indicating codebook parameters usable by the UE for generating channel state information (CSI) reports that include multiple channel quality indicators (CQIs), the control signaling further indicating a set of resources. The UE may the perform measurements for a set of reference signals received within the set of resources based on the codebook parameters, and generate a CSI report for the set of resources based on the measurements. The CSI report may include a set of multiple CQIs that are collectively associated with a set of multiple time intervals within the set resources. The UE may then transmit the CSI report to a network entity.

28 Claims, 16 Drawing Sheets

130

105

115

Network
Entity

Transceiver

1210

Antenna

1215

Communications
Manager

1220

Memory

Code

1230

1225

1240

Processor

1235

1205

1200

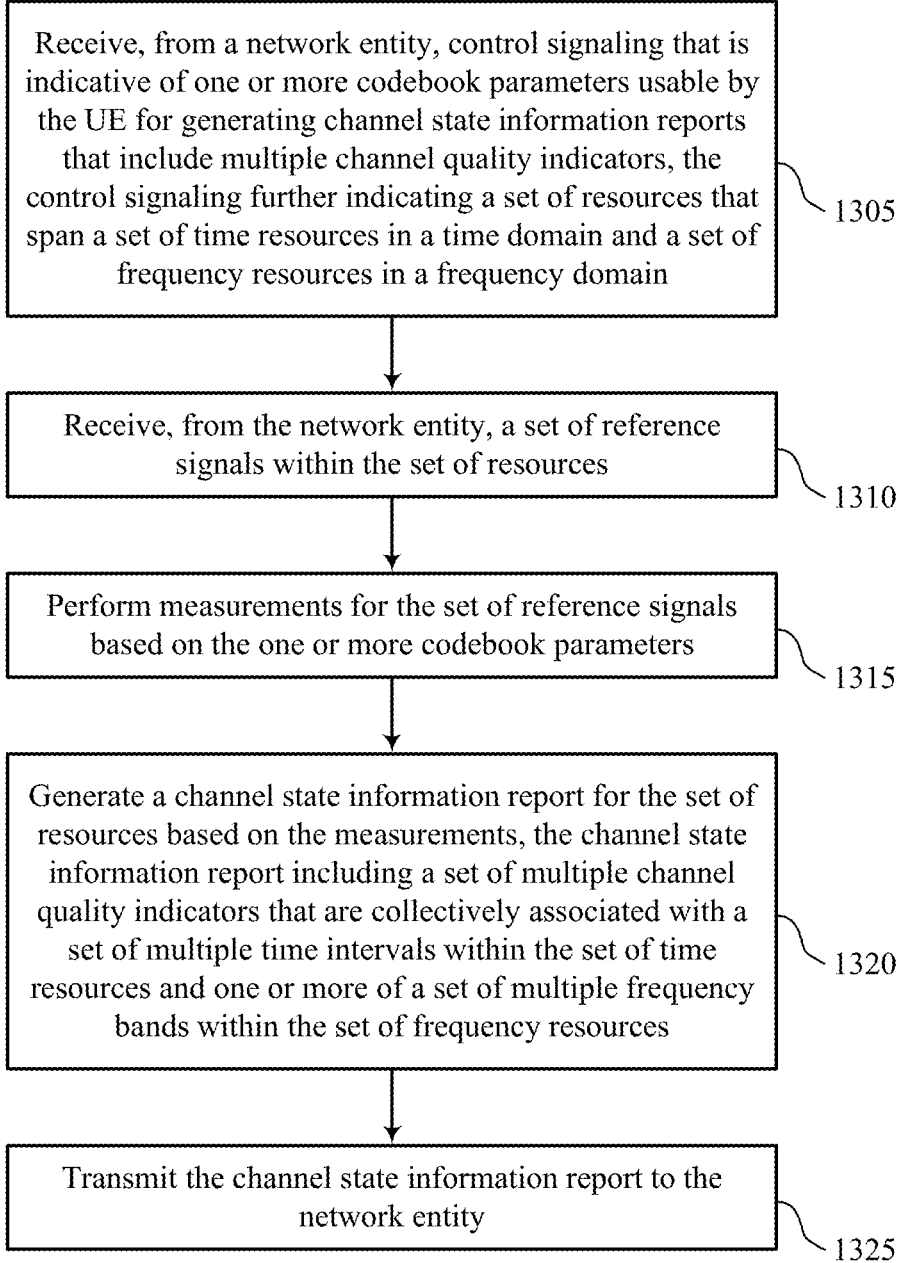

Receive, from a network entity, control signaling that is indicative of one or more codebook parameters usable by the UE for generating channel state information reports that include multiple channel quality indicators, the control signaling further indicating a set of resources that span a set of time resources in a time domain and a set of frequency resources in a frequency domain

1305

Receive, from the network entity, a set of reference signals within the set of resources

1310

Perform measurements for the set of reference signals based on the one or more codebook parameters

1315

Generate a channel state information report for the set of resources based on the measurements, the channel state information report including a set of multiple channel quality indicators that are collectively associated with a set of multiple time intervals within the set of time resources and one or more of a set of multiple frequency bands within the set of frequency resources

1320

Transmit the channel state information report to the network entity

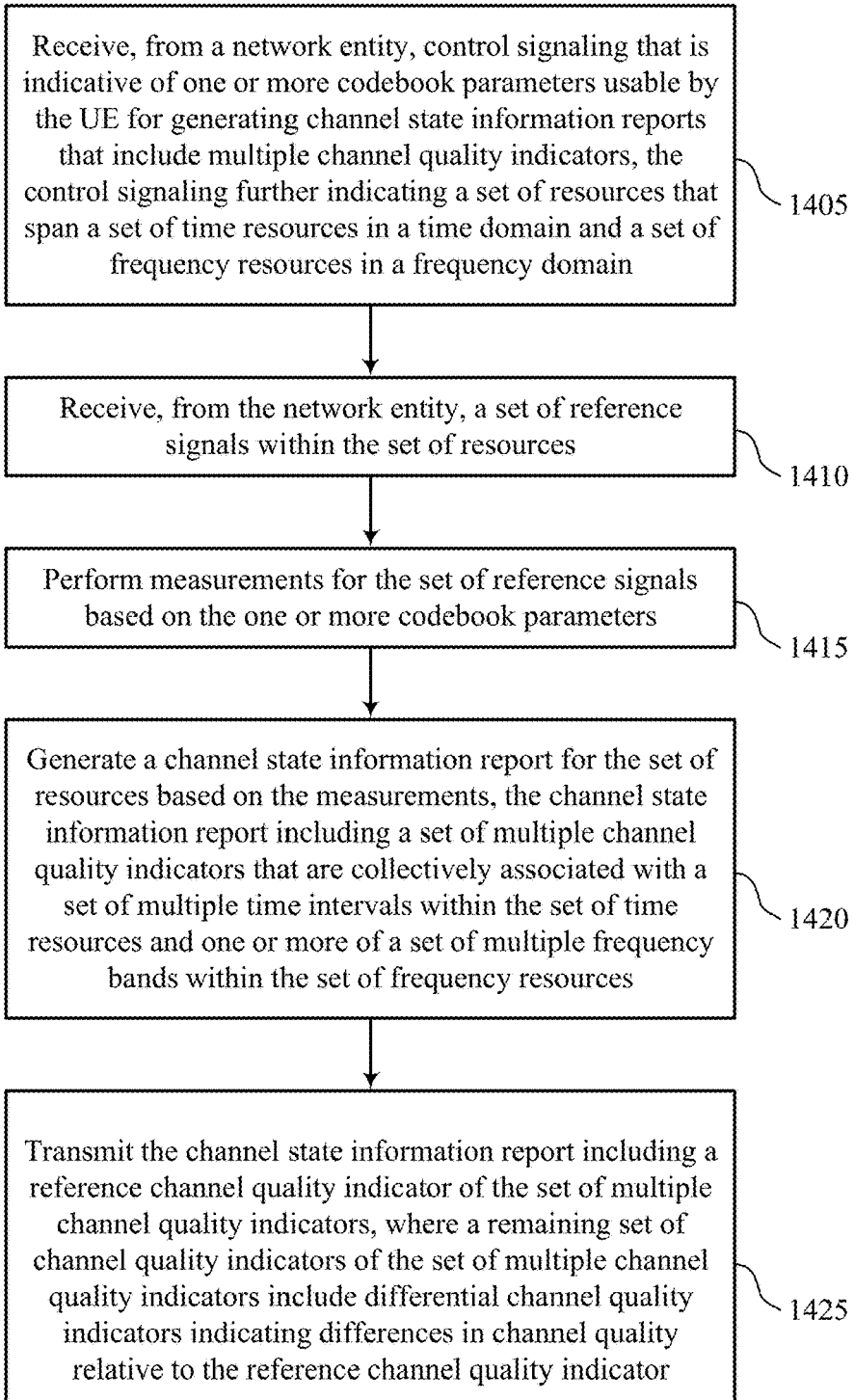

Receive, from a network entity, control signaling that is indicative of one or more codebook parameters usable by the UE for generating channel state information reports that include multiple channel quality indicators, the control signaling further indicating a set of resources that span a set of time resources in a time domain and a set of frequency resources in a frequency domain

1405

Receive, from the network entity, a set of reference signals within the set of resources

1410

Perform measurements for the set of reference signals based on the one or more codebook parameters

1415

Generate a channel state information report for the set of resources based on the measurements, the channel state information report including a set of multiple channel quality indicators that are collectively associated with a set of multiple time intervals within the set of time resources and one or more of a set of multiple frequency bands within the set of frequency resources

1420

Transmit the channel state information report including a reference channel quality indicator of the set of multiple channel quality indicators, where a remaining set of channel quality indicators of the set of multiple channel quality indicators include differential channel quality indicators indicating differences in channel quality relative to the reference channel quality indicator

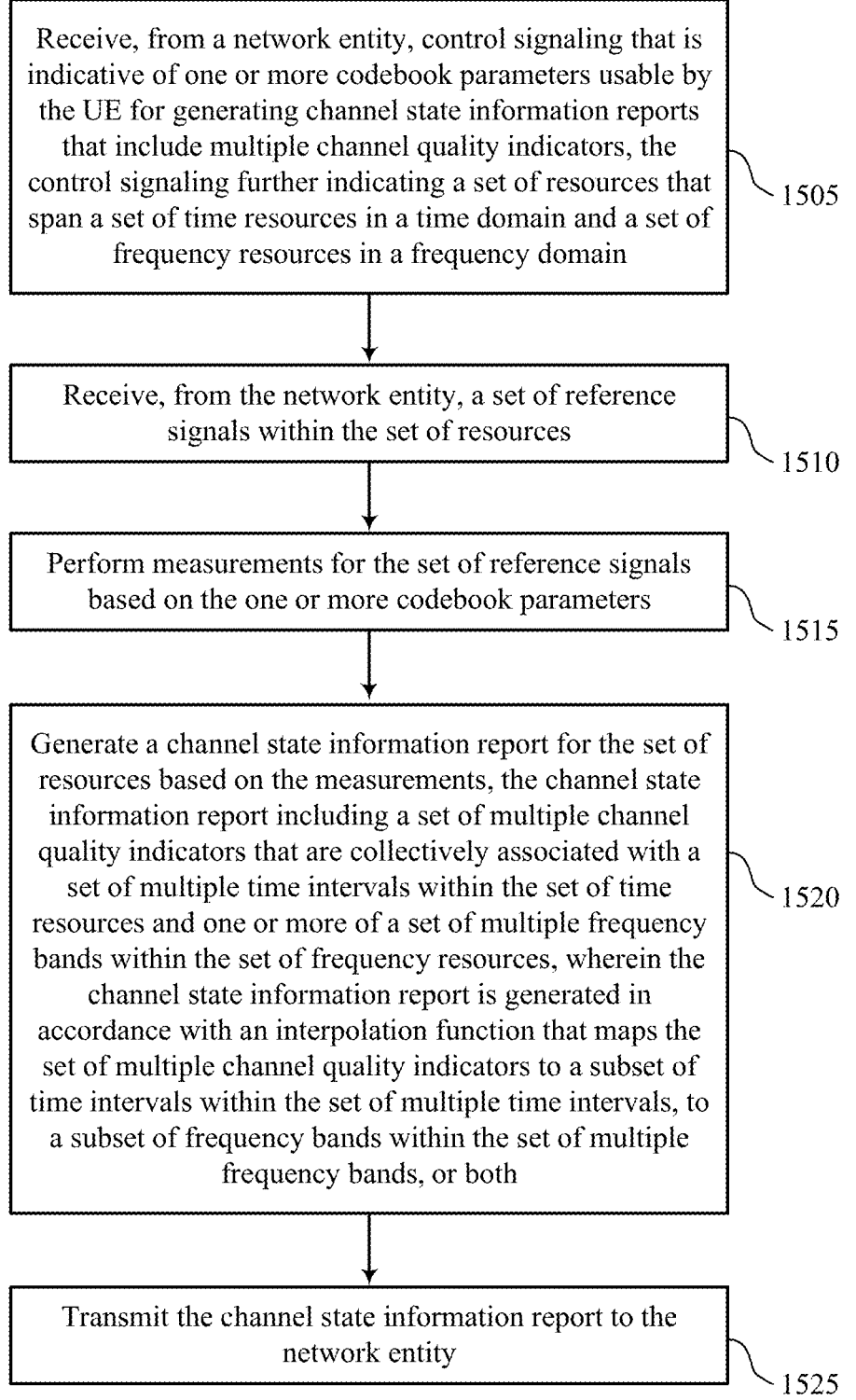

Receive, from a network entity, control signaling that is indicative of one or more codebook parameters usable by the UE for generating channel state information reports that include multiple channel quality indicators, the control signaling further indicating a set of resources that span a set of time resources in a time domain and a set of frequency resources in a frequency domain

1505

Receive, from the network entity, a set of reference signals within the set of resources

1510

Perform measurements for the set of reference signals based on the one or more codebook parameters

1515

Generate a channel state information report for the set of resources based on the measurements, the channel state information report including a set of multiple channel quality indicators that are collectively associated with a set of multiple time intervals within the set of time resources and one or more of a set of multiple frequency bands within the set of frequency resources, wherein the channel state information report is generated in accordance with an interpolation function that maps the set of multiple channel quality indicators to a subset of time intervals within the set of multiple time intervals, to a subset of frequency bands within the set of multiple frequency bands, or both

1520

Transmit the channel state information report to the network entity

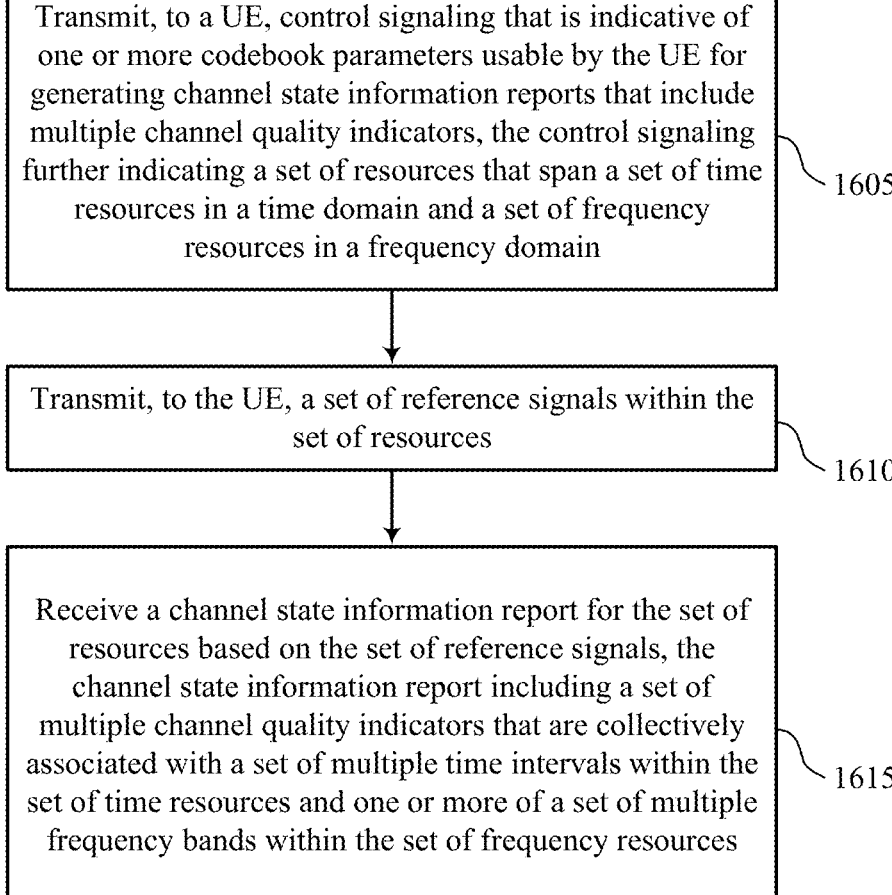

Transmit, to a UE, control signaling that is indicative of one or more codebook parameters usable by the UE for generating channel state information reports that include multiple channel quality indicators, the control signaling further indicating a set of resources that span a set of time resources in a time domain and a set of frequency resources in a frequency domain

1605

Transmit, to the UE, a set of reference signals within the set of resources

1610

Receive a channel state information report for the set of resources based on the set of reference signals, the channel state information report including a set of multiple channel quality indicators that are collectively associated with a set of multiple time intervals within the set of time resources and one or more of a set of multiple frequency bands within the set of frequency resources

TECHNIQUES FOR CHANNEL QUALITY INFORMATION REPORTING

FIELD OF TECHNOLOGY

The following relates to wireless communications, including techniques for channel quality information reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless networks, wireless devices (e.g., UEs) may perform measurements on reference signals received from the network, and transmit channel state information (CSI) reports including channel quality indicators (CQIs) determined based on the performed measurements. Such CSI reports may enable the network to perform channel estimation and adjust communications with the respective devices. In some networks, UEs may transmit CSI reports that indicate how CQI values change with respect to the spatial domain and/or the frequency domain, where it is assumed that CQI values are relatively constant over time. However, higher frequency ranges used in some wireless systems, as well as increased mobility of UEs, may cause CQI values to change over time.

SUMMARY

The described techniques relate to improved methods, systems, devices, and apparatuses that support techniques for channel quality information reporting. Generally, aspects of the present disclosure are directed to channel state information (CSI) reporting techniques for reporting changing channel quality indicator (CQI) values over time. In particular, aspects of the present disclosure are directed to rules and configurations that enable wireless devices to generate CSI reports that indicate changing CQI values in the time/Doppler domain (in addition to changes in the spatial and/or frequency domains). For example, a network may configure a user equipment (UE) with a CSI reporting configuration including codebook parameters for generating CSI reports that include multiple reported CQI values for different time intervals (e.g., first CQI(s) for first time interval, second CQI(s) for second time interval). In some cases, the codebook parameters are used to determine how many CQI values are to be reported in a CSI report for each frequency band. In some cases, the CSI report may indicate a "reference CQI" and multiple "differential CQIs" that are measured relative to the reference CQI. In such cases, the reference CQI may be a time-averaged CQI, minimum/maximum-valued CQI over time, or a CQI associated with an initial time/frequency resource reported for the CSI report. In other implementations, the multiple CQIs reported via the CSI report may be mapped to different time/frequency resources using an interpolation function, which may be configured by the network, or selected by the UE and reported to the network.

A method for wireless communication at a UE is described. The method may include receiving, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain, receiving, from the network entity, a set of reference signals within the set of resources, performing measurements for the set of reference signals based on the one or more codebook parameters, generating a CSI report for the set of resources based on the measurements, the CSI report including a set of multiple CQIs that are collectively associated with a set of multiple time intervals within the set of time resources and one or more of a set of multiple frequency bands within the set of frequency resources, and transmitting the CSI report to the network entity.

An apparatus for wireless communication at a UE is described. The apparatus may include a processor, memory coupled with the processor, and instructions stored in the memory. The instructions may be executable by the processor to cause the apparatus to receive, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain, receive, from the network entity, a set of reference signals within the set of resources, perform measurements for the set of reference signals based on the one or more codebook parameters, generate a CSI report for the set of resources based on the measurements, the CSI report including a set of multiple CQIs that are collectively associated with a set of multiple time intervals within the set of time resources and one or more of a set of multiple frequency bands within the set of frequency resources, and transmit the CSI report to the network entity.

Another apparatus for wireless communication at a UE is described. The apparatus may include means for receiving, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain, means for receiving, from the network entity, a set of reference signals within the set of resources, means for performing measurements for the set of reference signals based on the one or more codebook parameters, means for generating a CSI report for the set of resources based on the measurements, the CSI report including a set of multiple CQIs that are collectively associated with a set of multiple time intervals within the set of time resources and one or more of a set of multiple frequency bands within the set of frequency resources, and means for transmitting the CSI report to the network entity.

A non-transitory computer-readable medium storing code for wireless communication at a UE is described. The code may include instructions executable by a processor to receive, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain, receive, from the network entity, a set of reference signals within the set of resources, perform measurements for the set of reference signals based on the one or more codebook parameters, generate a CSI report for the set of resources based on the measurements, the CSI report including a set of multiple CQIs that are collectively associated with a set of multiple time intervals within the set of time resources and one or more of a set of multiple frequency bands within the set of frequency resources, and transmit the CSI report to the network entity.

In some examples of the method, apparatuses, and non-transitory computer-readable medium described herein, transmitting the CSI report may include operations, features, means, or instructions for transmitting the CSI report including a reference CQI of the set of multiple CQIs, where a remaining set of CQIs of the set of multiple CQIs include differential CQIs indicating differences in channel quality relative to the reference CQI.

In some examples of the method, apparatuses, and non-transitory computer-readable medium described herein, the reference CQI includes an average CQI associated with the set of multiple time intervals, the set of multiple frequency bands, or both.

In some examples of the method, apparatuses, and non-transitory computer-readable medium described herein, the reference CQI may be associated with an initial time interval of the set of multiple time intervals, an initial frequency band of the set of multiple frequency bands, or both.

In some examples of the method, apparatuses, and non-transitory computer-readable medium described herein, the reference CQI includes a highest CQI of the set of multiple CQIs, a lowest CQI of the set of multiple CQIs, or both.

Some examples of the method, apparatuses, and non-transitory computer-readable medium described herein may further include operations, features, means, or instructions for receiving, via the control signaling, an indication of one or more conditions for selecting the reference CQI, where generating the CSI report may be based on the one or more conditions.

In some examples of the method, apparatuses, and non-transitory computer-readable medium described herein, generating the CSI report may include operations, features, means, or instructions for generating the CSI report in accordance with an interpolation function that maps the set of multiple CQIs to a subset of time intervals within the set of multiple time intervals, to a subset of frequency bands within the set of multiple frequency bands, or both.

Some examples of the method, apparatuses, and non-transitory computer-readable medium described herein may further include operations, features, means, or instructions for receiving, via the control signaling, an indication of the interpolation function, where generating the CSI report may be based on receiving the indication of the interpolation function.

Some examples of the method, apparatuses, and non-transitory computer-readable medium described herein may further include operations, features, means, or instructions for transmitting, via the CSI report, an indication of the interpolation function used by the UE to generate the CSI report.

In some examples of the method, apparatuses, and non-transitory computer-readable medium described herein, a quantity of CQIs of the set of multiple CQIs that correspond to the set of multiple time intervals may be based on the one or more codebook parameters.

In some examples of the method, apparatuses, and non-transitory computer-readable medium described herein, the one or more codebook parameters include a size of a codebook associated with CSI reporting, a quantity of time-domain bases associated with the CSI report, a type of bases associated with the CSI report, or any combination thereof.

Some examples of the method, apparatuses, and non-transitory computer-readable medium described herein may further include operations, features, means, or instructions for receiving, via the control signaling, an indication of a length of the set of time resources in the time domain, a quantity of time intervals included within the set of multiple time intervals of the set of time resources, or both, where the one or more codebook parameters include the length, the quantity of time intervals, or both.

Some examples of the method, apparatuses, and non-transitory computer-readable medium described herein may further include operations, features, means, or instructions for transmitting a first portion of the CSI report including a first subset of CQIs of the set of multiple CQIs and transmitting a second portion of the CSI report including a second subset of CQIs of the set of multiple CQIs, where the first subset of CQIs and the second subset of CQIs may be determined in accordance with one or more priority rules.

Some examples of the method, apparatuses, and non-transitory computer-readable medium described herein may further include operations, features, means, or instructions for receiving, via the control signaling, an indication of the one or more priority rules, where generating the CSI report may be based on receiving the indication of the one or more priority rules.

Some examples of the method, apparatuses, and non-transitory computer-readable medium described herein may further include operations, features, means, or instructions for receiving scheduling information for one or more communications between the UE and the network entity based on the CSI report and performing the one or more communications with the network entity based on the scheduling information.

A method for wireless communication at a network entity is described. The method may include transmitting, to a UE, control signaling that is indicative of one or more codebook parameters usable by the UE for generating CSI reports that include multiple CQIs, the control signaling further indicating a set of resources that span a set of time resources in a time domain and a set of frequency resources in a frequency domain, transmitting, to the UE, a set of reference signals within the set of resources, and receiving a CSI report for the set of resources based on the set of reference signals, the CSI report including a set of multiple CQIs that are collectively associated with a set of multiple time intervals within the set of time resources and one or more of a set of multiple frequency bands within the set of frequency resources.

An apparatus for wireless communication at a network entity is described. The apparatus may include a processor, memory coupled with the processor, and instructions stored in the memory. The instructions may be executable by the processor to cause the apparatus to transmit, to a UE, control signaling that is indicative of one or more codebook parameters usable by the UE for generating CSI reports that include multiple CQIs, the control signaling further indicating a set of resources that span a set of time resources in a time domain and a set of frequency resources in a frequency domain, transmit, to the UE, a set of reference signals within the set of resources, and receive a CSI report for the set of resources based on the set of reference signals, the CSI report including a set of multiple CQIs that are collectively associated with a set of multiple time intervals within the set of time resources and one or more of a set of multiple frequency bands within the set of frequency resources.

Another apparatus for wireless communication at a network entity is described. The apparatus may include means for transmitting, to a UE, control signaling that is indicative of one or more codebook parameters usable by the UE for generating CSI reports that include multiple CQIs, the control signaling further indicating a set of resources that span a set of time resources in a time domain and a set of frequency resources in a frequency domain, means for transmitting, to the UE, a set of reference signals within the set of resources, and means for receiving a CSI report for the set of resources based on the set of reference signals, the CSI report including a set of multiple CQIs that are collectively associated with a set of multiple time intervals within the set of time resources and one or more of a set of multiple frequency bands within the set of frequency resources.

A non-transitory computer-readable medium storing code for wireless communication at a network entity is described. The code may include instructions executable by a processor to transmit, to a UE, control signaling that is indicative of one or more codebook parameters usable by the UE for generating CSI reports that include multiple CQIs, the control signaling further indicating a set of resources that span a set of time resources in a time domain and a set of frequency resources in a frequency domain, transmit, to the UE, a set of reference signals within the set of resources, and receive a CSI report for the set of resources based on the set of reference signals, the CSI report including a set of multiple CQIs that are collectively associated with a set of multiple time intervals within the set of time resources and one or more of a set of multiple frequency bands within the set of frequency resources.

In some examples of the method, apparatuses, and non-transitory computer-readable medium described herein, receiving the CSI report may include operations, features, means, or instructions for receiving the CSI report including a reference CQI of the set of multiple CQIs, where a remaining set of CQIs of the set of multiple CQIs include differential CQIs indicating differences in channel quality relative to the reference CQI.

In some examples of the method, apparatuses, and non-transitory computer-readable medium described herein, the reference CQI includes an average CQI associated with the set of multiple time intervals, the set of multiple frequency bands, or both.

In some examples of the method, apparatuses, and non-transitory computer-readable medium described herein, the reference CQI may be associated with an initial time interval of the set of multiple time intervals, an initial frequency band of the set of multiple frequency bands, or both.

In some examples of the method, apparatuses, and non-transitory computer-readable medium described herein, the reference CQI includes a highest CQI of the set of multiple CQIs, a lowest CQI of the set of multiple CQIs, or both.

Some examples of the method, apparatuses, and non-transitory computer-readable medium described herein may further include operations, features, means, or instructions for transmitting, via the control signaling, an indication of one or more conditions for selecting the reference CQI, where receiving the CSI report may be based on the one or more conditions.

In some examples of the method, apparatuses, and non-transitory computer-readable medium described herein, the CSI report may be based on an interpolation function that maps the set of multiple CQIs to a subset of time intervals within the set of multiple time intervals, to a subset of frequency bands within the set of multiple frequency bands, or both.

Some examples of the method, apparatuses, and non-transitory computer-readable medium described herein may further include operations, features, means, or instructions for transmitting, via the control signaling, an indication of the interpolation function, where receiving the CSI report may be based on transmitting the indication of the interpolation function.

Some examples of the method, apparatuses, and non-transitory computer-readable medium described herein may further include operations, features, means, or instructions for receiving, via the CSI report, an indication of the interpolation function used by the UE to generate the CSI report.

In some examples of the method, apparatuses, and non-transitory computer-readable medium described herein, a quantity of CQIs of the set of multiple CQIs that correspond to the set of multiple time intervals may be based on the one or more codebook parameters.

In some examples of the method, apparatuses, and non-transitory computer-readable medium described herein, the one or more codebook parameters include a size of a codebook associated with CSI reporting, a quantity of time-domain bases associated with the CSI report, a type of bases associated with the CSI report, or any combination thereof.

Some examples of the method, apparatuses, and non-transitory computer-readable medium described herein may further include operations, features, means, or instructions for transmitting, via the control signaling, an indication of a length of the set of time resources in the time domain, a quantity of time intervals included within the set of multiple time intervals of the set of time resources, or both, where the one or more codebook parameters include the length, the quantity of time intervals, or both.

Some examples of the method, apparatuses, and non-transitory computer-readable medium described herein may further include operations, features, means, or instructions for determining one or more instantaneous CQIs associated with the set of multiple time intervals, the set of multiple frequency bands, or both, based on the set of multiple CQIs included within the CSI report, transmitting scheduling information for one or more communications between the UE and the network entity based on the one or more instantaneous CQIs, and performing the one or more communications with the UE based on the scheduling information.

Some examples of the method, apparatuses, and non-transitory computer-readable medium described herein may further include operations, features, means, or instructions for receiving a first portion of the CSI report including a first subset of CQIs of the set of multiple CQIs and receiving a second portion of the CSI report including a second subset of CQIs of the set of multiple CQIs, where the first subset of CQIs and the second subset of CQIs may be determined in accordance with one or more priority rules.

Some examples of the method, apparatuses, and non-transitory computer-readable medium described herein may further include operations, features, means, or instructions for transmitting, via the control signaling, an indication of the one or more priority rules, where generating the CSI report may be based on receiving the indication of the one or more priority rules.

BRIEF DESCRIPTION OF THE DRAWINGS

FIGS. 13 through 16 illustrate flowcharts showing methods that support techniques for channel quality information reporting in accordance with one or more aspects of the present disclosure.

DETAILED DESCRIPTION

Figure 1:
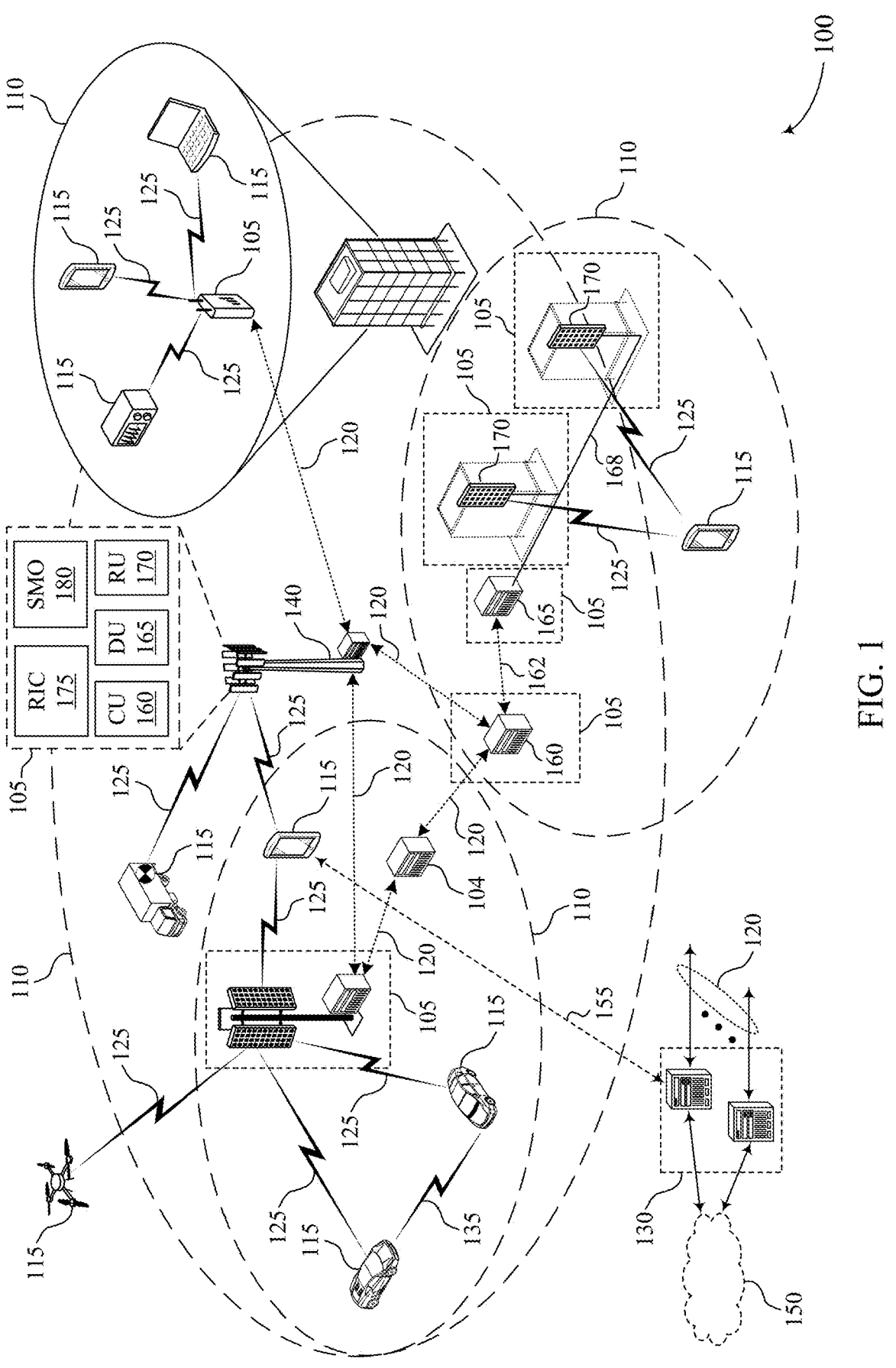
FIG. 1 illustrates an example of a wireless communications system that supports techniques for channel quality information reporting in accordance with one or more aspects of the present disclosure.

In some wireless networks, wireless devices (e.g., user equipment (UEs)) may perform measurements on reference signals received from the network, and transmit channel state information (CSI) reports including channel quality indicators (CQIs) determined based on the performed measurements. Such CSI reports may enable the network to perform channel estimation and adjust communications with the respective devices. In some networks, UEs may transmit CSI reports that indicate how CQI values change with respect to the spatial domain and/or the frequency domain. That is, CSI reports may indicate different CQI values for different beams, different CQI values for different frequency bands, or both. Moreover, in conventional CSI reporting, it is assumed that CQI values are relatively constant over time. However, higher frequency ranges used in some wireless systems, as well as increased mobility of UEs, may cause CQI values to change over time. For example, UEs with high mobility (e.g., UEs aboard a fast moving vehicle) may experience rapidly changing channel conditions over time. In such cases, conventional CSI reporting with respect to the spatial and frequency domains do not accurately depict how CQI values are changing at the UE with respect to the time/Doppler domain. As such, the network may not have information as to how the channel quality between the UE and the network has changed (or is expected to change) over time.

Accordingly, aspects of the present disclosure are directed to CSI reporting techniques for reporting changing CQI values over time. In particular, aspects of the present disclosure are directed to rules and configurations that enable wireless devices to generate CSI reports that indicate changing CSI values in the time/Doppler domain (in addition to changes in the spatial and/or frequency domains).

For example, a network may configure a UE with a CSI reporting configuration including codebook parameters for generating CSI reports that include multiple reported CQI values for different time intervals (e.g., first CQI(s) for first time interval, second CQI(s) for second time interval). In some cases, the codebook parameters are used to determine how many CQI values are to be reported in a CSI report for each frequency band. In some cases, the CSI report may indicate a "reference CQI" and multiple "differential CQIs" that are measured relative to the reference CQI. In such cases, the reference CQI may be a time-averaged CQI, minimum/maximum-valued CQI over time, or a CQI associated with an initial time/frequency resource reported for the CSI report. In other implementations, the multiple CQIs reported via the CSI report may be mapped to different time/frequency resources using an interpolation function, which may be configured by the network, or selected by the UE and reported to the network.

Aspects of the disclosure are initially described in the context of wireless communications systems. Additional aspects of the disclosure are described in the context of an example CSI reporting configuration and an example process flow. Aspects of the disclosure are further illustrated by and described with reference to apparatus diagrams, system diagrams, and flowcharts that relate to techniques for channel quality information reporting.

FIG. 1 illustrates an example of a wireless communications system 100 that supports techniques for channel quality information reporting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for channel quality information reporting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some aspects, the respective devices of the wireless communications system 100 may support CSI reporting techniques for reporting changing CQI values over time. In particular, the wireless communications system 100 may support rules and configurations that enable wireless devices (e.g., UEs 115) to generate CSI reports that indicate changing CSI values in the time/Doppler domain (in addition to changes in the spatial and/or frequency domains).

For example, a network entity 105 of the wireless communications system 100 may configure a UE 115 with a CSI reporting configuration including codebook parameters for generating CSI reports that include multiple reported CQI values for different time intervals (e.g., first CQI(s) for first time interval, second CQI(s) for second time interval). In some cases, the codebook parameters are used to determine how many CQI values are to be reported in a CSI report for each frequency band.

Subsequently, the UE 115 may perform measurements on reference signals received from the network, and may determine CQI values for different time, frequency, and/or spatial resources. The UE 115 may then generate a CSI report that includes the respective CQI values. In some cases, the CSI report may indicate a "reference CQI" and multiple "differential CQIs" that are measured relative to the reference CQI. In such cases, the reference CQI may be a time-averaged CQI, minimum/maximum-valued CQI over time, or a CQI associated with an initial time/frequency resource reported for the CSI report. In other implementations, the multiple CQIs reported via the CSI report may be mapped to different time/frequency resources using an interpolation function, which may be configured by the network, or selected by the UE and reported to the network.

Techniques described herein may facilitate three-dimensional (3D) CSI reporting with respect to the spatial, frequency, and Doppler (time) domains. In particular, techniques described herein may enable UEs 115 to report how CQI values change with respect to the spatial, frequency, and time domains. As such, aspects of the present disclosure may enable UEs 115 to indicate how a relative quality of a channel changes over time, as well as how the quality of channel changes within different frequency bands and/or spatial resources. By enabling UEs 115 to report how CQI values have changed (or are expected to change) over time, aspects of the present disclosure may facilitate more complete and comprehensive channel estimation, which may enable the network to schedule wireless communications more effectively, leading to a more efficient use of resources and more reliable wireless communications.

Figure 2:
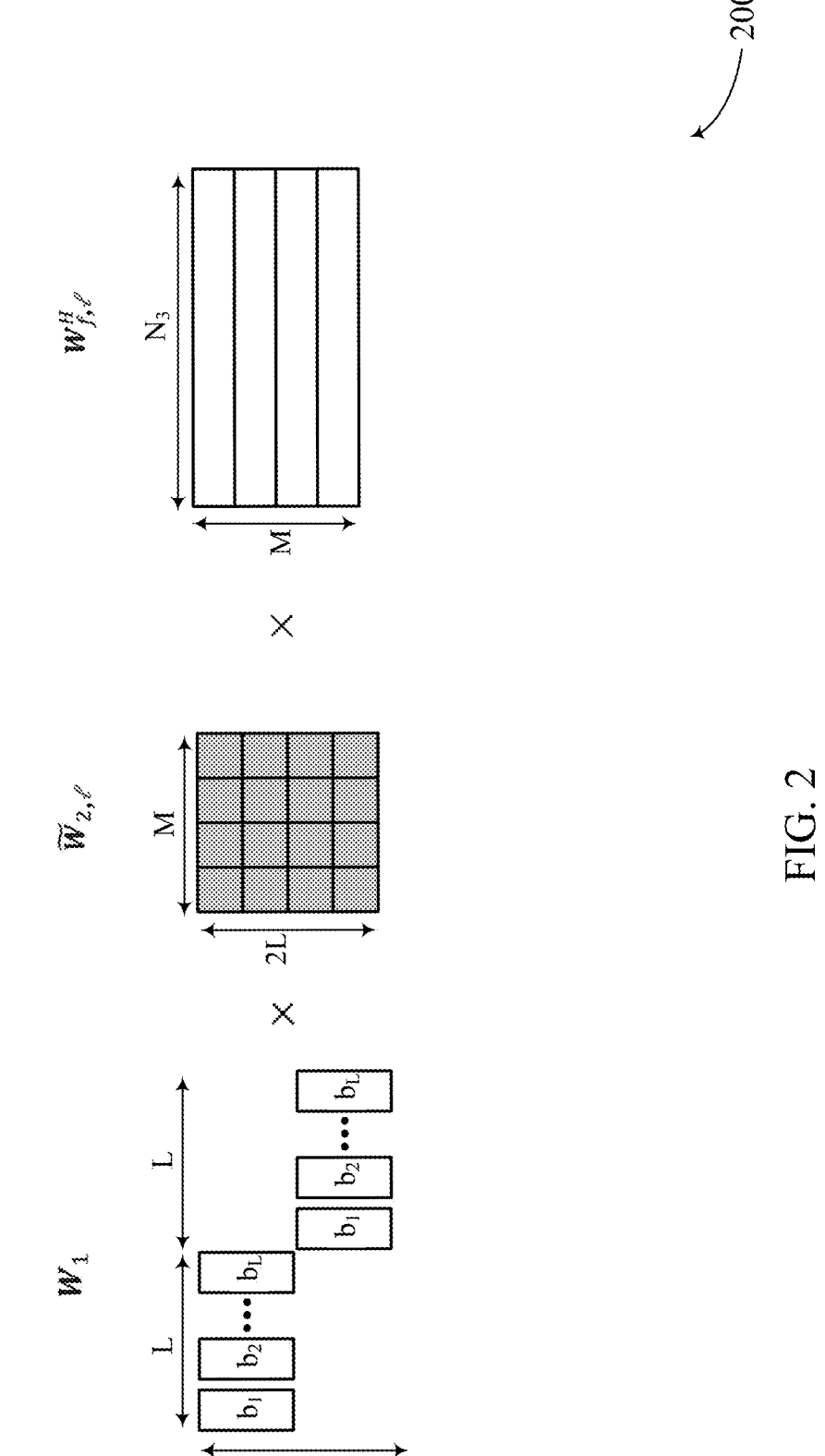
FIG. 2 illustrates an example of a channel state information (CSI) reporting configuration that supports techniques for channel quality information reporting in accordance with one or more aspects of the present disclosure.

FIG. 2 illustrates an example of a CSI reporting configuration 200 that supports techniques for channel quality information reporting in accordance with one or more aspects of the present disclosure. Aspects of the CSI reporting configuration 200 may implement, or be implemented by, aspects of the wireless communications system 100.

The CSI reporting configuration 200 illustrates an example reporting scheme for Type-II Doppler codebook CSI reporting. Some networks may utilize a codebook structure of size $N_r \times N_3$ for a respective communication/transmission layer ($\ell$), where $N_r$ is the number of Tx antennas (e.g., number of Tx antennas used by the network to transmit reference signals), and $N_3$ is the quantity of precoding matrix indicator (PMI) matrices determined by number of CQI sub-bands and a number of PMI sub-bands per CQI sub-band.

In the context of CSI reporting, a UE 115 may perform measurements on reference signals received from the network, and may be configured to transmit a CSI report based on the performed measurements. For each communication/transmission layer $\ell$, the UE 115 may be configured to report (e.g., via a CSI report) a precoding matrix $W^{(\ell)}$ described by Equation 1 below:

$$W^{(\ell)} = W_1 \times \tilde{W}_{2,\ell} \times W_{f,\ell}^H \tag{1}$$

where $W^{(\ell)}$ is the precoding matrix for layer & that is reported to the network, $W_1$ is the spatial domain basis, $\tilde{W}_{2,\ell}$ is the coefficient bitmap indicating NZCs, and $W_{f,\ell}^H$ is the frequency domain basis. The precoding matrix W is further illustrated as the set of bases 205 illustrated in FIG. 2.

In some aspects, the spatial domain basis $W_1$ (DFT bases) is a $N_t \times 2L$ matrix indicating selected spatial domain bases, as illustrated in FIG. 2. In some aspects, $W_1$ is layer-common (e.g., constant across communication/transmission layers $\ell$), where $N_t$ indicates the quantity of Tx antenna ports at the network entity 105 used to transmit the reference signals measured by the UE 115, where $N_t$ may be configured by the network (e.g., RRC-configured). Further, L may represent the number of beams used by the network (e.g., L={2, 4, 6}), and may be RRC-configured.

As shown in FIG. 2, the frequency domain basis $W_{f,\ell}^H$ (DFT bases) may be represented by an $M \times N_3$ matrix indicating selected frequency domain bases, where $N_3$ is a parameter that spans the frequency domain, and is based on a quantity of PMI sub-bands, as described herein. The frequency domain basis $W_{f,\ell}^H$ may be layer-specific (e.g., changes across communication/transmission layers $\ell$). The value M may indicate the number of frequency domain bases, and may be rank-pair specific based on a rank indicator (RI) (e.g., $M_1=M_2$ for rank={1,2}, and $M_3=M_4$ for rank={3,4}, where $M_1$ and/or $M_3$ is RRC-configured).

The coefficient matrix $\tilde{W}_{2,\ell}$ may include a $2L \times M$ matrix, where the coefficient matrix $\tilde{W}_2$ is layer-specific (e.g., changes across communication/transmission layers $\ell$). In other words, the UE 115 may report different coefficient matrices $\tilde{W}_2$ for each layer, where each respective coefficient matrix indicates non-zero coefficients (NZCs) for the respective layer (and where unreported coefficients are set to zeros in the respective coefficient matrices). For each layer, the UE 115 may be configured to report up to $K_0$ NZCs, where $K_0$ may be configured by the network (e.g., RRC-configured). Further, the UE 115 may be configured to report up to $2K_0$ NZCs across all layers.

It is noted herein that the "frequency domain" and the "delay domain" are Fourier transforms of one another. Similarly, the "Doppler domain" and the "time domain" are Fourier transforms of one another. Accordingly, for the purposes of the present disclosure, the terms "frequency domain" and "delay domain" and the terms "Doppler domain" and "time domain" may be used interchangeably.

Attendant advantages of the present disclosure may be further shown and described with reference to FIG. 3.

Figure 3:
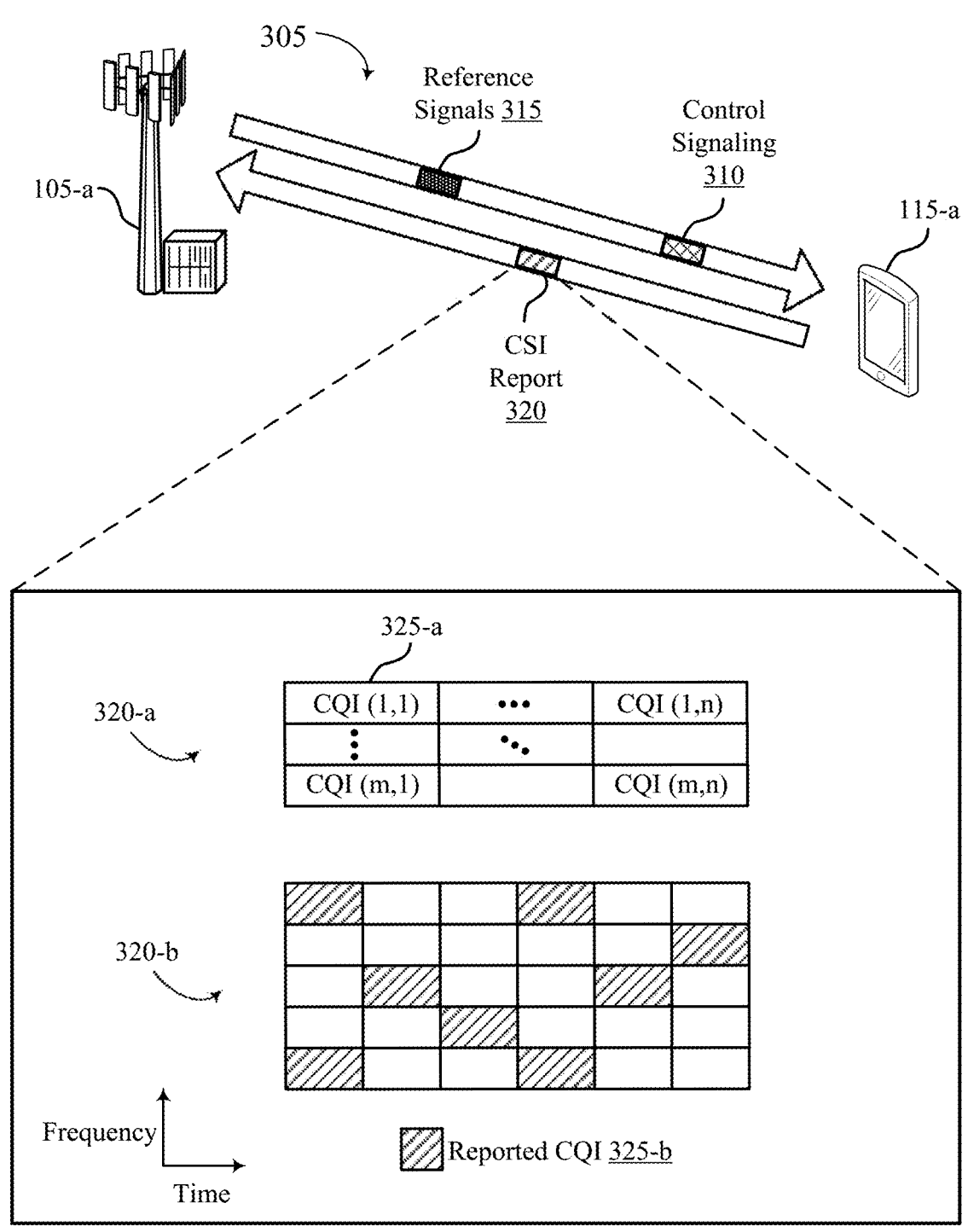
FIG. 3 illustrates an example of a wireless communications system that supports techniques for channel quality information reporting in accordance with one or more aspects of the present disclosure.

FIG. 3 illustrates an example of a wireless communications system 300 that supports techniques for channel quality information reporting in accordance with one or more aspects of the present disclosure. Aspects of the wireless communications system 300 may implement, or be implemented by, aspects of the wireless communications system 100, the CSI reporting configuration 200, or both. In particular, the wireless communications system 300 may support techniques that enable UEs 115 to transmit CSI reports that indicate changing CQI values over time, as described herein.

The wireless communications system 300 may include a UE 115-a and a network entity 105-a, which may be examples of wireless devices as described herein. In some aspects, the UE 115-a and the network entity 105-a may communicate with one another using a communication link 305, which may be an example of an NR or LTE link between the respective devices. In some cases, the communication link 305 may include an example of an access link (e.g., Uu link) which may include a bi-directional link that enables both uplink and downlink communication. For example, the UE 115-a may transmit uplink signals, such as uplink control signals or uplink data signals, to one or more components of the network entity 105-a using the communication link 305, and one or more components of the network entity 105-a may transmit downlink signals, such as downlink control signals or downlink data signals, to the UE 115-a using the communication link 305.

As noted previously herein, some wireless devices (e.g., UEs 115) may perform measurements on reference signals received from the network, and transmit CSI reports indicating CQI values associated with the channel between the UE 115 and the network. Such CSI reports may enable the network to perform channel estimation and adjust communications with the respective devices. In some aspects, UEs 115 may determine CQI values based on measurements performed on the reference signals received from the network. CQI values may be based on the PMI, RI, and/or CSI-RS resource indicator (CRI) that is reported to the network.

In some aspects, the network may configure UEs 115 with a CSI reporting configuration (e.g., CSI-ReportConfig) that includes various parameters used by the UE 115 for generating CSI reports. In some cases, parameters included or defined by a CSI reporting configuration may include, but are not limited to, reportFreqConfiguration, cqi-BitsPerSub-band, and the like. The reportFreqConfiguration parameter may indicate the reporting granularity in the frequency domain, including the CSI reporting band and whether PMI/CQI reporting is wideband or sub-band. When wideband CQI reporting is configured, a wideband CQI value is reported for each codeword for the entire CSI reporting band. Comparatively, when sub-band CQI reporting is configured, one CQI for each codeword is reported for each sub-band in the CSI reporting band.

If the higher layer parameter cqi-BitsPerSub-band in the CSI reporting configuration is not defined or configured, a two-bit sub-band differential CQI for each sub-band index (s) is defined as: sub-band offset level(s)=sub-band CQI index(s)−wideband CQI index. Comparatively, if the higher layer cqi-BitsPerSub-band in the CSI reporting configuration is defined or configured, a four-bit sub-band CQI for each sub-band index (s) is reported based on one or more tables that may be defined by the network or relevant standards.

In some networks, a CSI report transmitted by the UE 115 indicates CQI values of a precoding matrix relative to the spatial domain and the frequency domain (e.g., two-dimensional CSI reporting). In other words, conventional CSI reporting techniques indicate how channel conditions change with respect to the spatial and frequency domains. Moreover, in conventional CSI reporting, it is assumed that CQI values (and therefore precoding matrices) are relatively constant over time.

However, higher frequency ranges used in some wireless systems, as well as increased mobility of UEs 115, may cause CQI values (e.g., precoding matrices) to change over time. For example, UEs 115 with high mobility (e.g., UEs 115 aboard a fast moving vehicle) may experience rapidly changing channel conditions over time. In such cases, conventional CSI reporting with respect to the spatial and frequency domains do not accurately depict how CQI values are changing at the UE 115 with respect to the time/Doppler domain. As such, the network may not have information as to how the channel quality between the UE 115 and the network has changed (or is expected to change) over time.

Accordingly, aspects of the present disclosure are directed to CSI reporting techniques for reporting changing CQI values over time. In particular, aspects of the present disclosure are directed to rules and configurations that enable wireless devices to generate CSI reports that indicate changing CSI values in the time/Doppler domain (in addition to changes in the spatial and/or frequency domains).

In other words, aspects of the present disclosure may enable Type-II PMI codebooks for the wireless communications system 300 to be enhanced and extended for time-domain (e.g., Doppler domain) CSI reporting. As described previously herein, Doppler domain orthogonal DFT basis that is commonly selected for all spatial and frequency domain bases may be supported (e.g., $W=W_1 \tilde{W}_2 (W_f \otimes W_d)^H$). With the addition of the new time/Doppler domain basis for CSI reporting, aspects of the present disclosure are directed to rules and conditions used to determine whether a single CQI value can be reported for multiple time intervals, or whether multiple CQI values are reported for different time/Doppler indices (e.g., different CQI values for different time intervals). As the channel between the UE 115-*a* and the network entity 105-*a* changes over time (e.g., varies in the Doppler/time domain), different CQI values may meet defined quality of service (QOS) parameters. Moreover, as will be described in further detail herein, CSI reporting techniques may enable the UE 115-*a* to report a wideband CQI value and sub-band (differential) CQI metrics in the frequency domain. Further, a similar approach may be extended to the time/Doppler domain to further reduce overhead associated with 3D CSI reporting.

For example, referring to the wireless communications system 300 in FIG. 3, the UE 115-*a* may receive control signaling 310 (e.g., RRC, DCI, MAC-CE) from the network entity 105-*a*, where the control signaling 310 indicates one or more codebook parameters usable for generating CSI reports 320 that include multiple CQIs 325 (e.g., CSI reporting codebook parameters). In other words, the control signaling 310 may indicate a CSI reporting configuration including codebook parameters for generating 3D CSI reports 320 (e.g., CSI reports 320 that indicate CQIs 325 with respect to the spatial, frequency, and/or time/Doppler domain).

In some aspects, the one or more codebook parameters may determine how many CQIs 325 (*n*) that the UE 115-*a* is to report within the CSI report 320 (e.g., how many CQIs 325 reported relative to the time domain, how many CQIs 325 reported relative to the frequency domain, how many CQIs 325 to report per transmission layer, and the like). For example, the one or more codebook parameters may include a size of a codebook associated with CSI reporting, a quantity of bases for CSI reporting, a type of bases for CSI reporting, or any combination thereof.

In some aspects, the control signaling 310 may further indicate a set of resources that are to be measured by the UE 115-*a* for CSI reporting. For example, set of resources may span a set of time resources in the time domain, and a set of frequency resources in the frequency domain, where the control signaling 310 indicates a length of the set of time resources in the time domain, a quantity of time intervals included within the set of time resources (e.g., how many CQIs 325 are to be reported for different time intervals of the set of time resources), or both. In other words, the control signaling 310 may indicate parameters associated with the resources to be used for CSI reporting, such as a length of the time-domain bases ($N_4$), a quantity of time intervals (m) (e.g., sub-windows) included within the set of time resources, a quantity of time-domain bases (Q), a type of bases associated with the CSI report 320 to be generated by the UE 115-*a*, or any combination thereof. Such indications (e.g., $N_4$, m, Q) may include CSI codebook parameters that will be used to generate the CSI report 320.

In other words, the quantity/number n number of CQIs 325 are reported in a single CSI report 320 may be based on the configured codebook parameters. As noted previously herein, the codebook parameters may include, but are not limited to, a codebook size, a number of basis, type of basis, and the like.

In some cases, rules or mappings for using the codebook parameters to determine the value of n (e.g., how many CQIs 325 are reported per CSI report 320 and/or per layer) may be signaled by the network, pre-configured by the network, or both. For example, a rule or condition may be defined for deriving the value of n as a function of the codebook parameter $N_4$ (the length of the time domain basis). For instance, the rule may define n as $n=\text{ceil}(N_4/m)$, where m is configured via the control signaling 310 as m=1, 2, . . . , etc. In this example, the codebook parameter m indicates a number of time intervals (e.g., sub-windows) of the overall CSI time window. The size of the time intervals/sub-windows may be based on the Doppler (e.g., the channel coherence time). Moreover, the size of the time intervals/sub-windows (quantity defined by m) may be determined/selected based on the time-domain channel property (TDCP) reported by the UE 115-*a*, where the network entity 105-*b* may configure (or reconfigure) the sub-window size semi-statically or dynamically.

By way of another example, a rule or condition may be defined for deriving the value of n as a function of the codebook parameter Q (number of time domain basis). For example, the rule may specify that n=Q. By way of yet another example, a rule or condition may be defined for deriving the value of n as a function of the type of time/Doppler domain basis. For instance, the rule may specify that $n=n_1$ for identity basis, $n=n_2$ for DFT basis, $n=n_3$ for DCT basis, and the like.

In cases where multiple CQIs 325 are to be reported for a single CSI report 320, the control signaling 310 may indicate additional rules, parameters, and/or conditions regarding how the CQIs 325 are to be reported. For example, in some implementations, the control signaling 310 may instruct for the UE 115-*a* to report a single (full) CQI 325 and corresponding differential CQIs 325. For instance, as shown in the first CSI report 320-*a* illustrated in FIG. 3, the UE 115-*a* may be configured to generate a CSI report 320-*a* that includes a set of CQIs 325-*a*. In this example, the set of CQIs 325-*a* may include one reference CQI 325, and multiple differential CQIs 325, where the differential CQIs 325 indicate differences in CQI relative to the reference CQI 325. For instance, in some cases, the CQI (1,1), may include the reference CQI 325, where all other CQIs 325 in the set of CQIs 325 include differential CQIs 325 reported relative to the reference CQI (1,1).

In some cases, the single reference CQI 325 may be associated with an average value applicable to the entire codebook. In this example, the set of CQIs 325-*a* (represented as CQI (x,y), where (x,y) denotes the sub-band and time/Doppler block combination associated with Type-II PMI) which are indicated via the first CSI report 320-*a* may be reported as CQI (x,y)=avg(CQI)+dCQI (x,y), where each CQI 325 of the set of CQIs 325-*a* are determined based on the reference CQI (e.g., avg(CQI)) and deferential CQIs (e.g., dCQI (x,y)).

Continuing with reference to the first CSI report 320-*a*, in additional or alternative implementations, the single reference CQI 325 may correspond to a respective subset of time and frequency resources where the codebook is applied. For example, the CQI (m,n) may be selected as the reference CQI 325, where all other CQIs 325 are reported as a differential CQI relative to the reference CQI (m,n) (e.g., CQI (x,y)=ref(CQI)+dCQI (x,y)). Similarly, in a specific case, the reference CQI 325 (e.g., ref(CQI)) may be associated with the initial time/frequency resource of the set of resources over which the codebook is applied. In other words, the CQI (1,1) may be selected as the reference CQI 325, where all other reported CQIs 325 are reported as differential CQIs relative to the reference CQI (1,1). By way of yet another example, the reference CQI 325 may be defined as the highest or lowest CQI 325 reported (where all other CQIs 325 are reported as differential CQIs 325 relative to the highest/lowest CQI).

In cases where the UE 115-*a* is configured to report CQIs 325 as a reference CQI 325 and differential CQIs 325, the control signaling 310 may indicate rules or conditions that are used by the UE 115-*b* to determine which CQI 325 of the set of CQIs 325-*a* that is to be selected as the reference CQI 325. Moreover, in some cases, reported CQIs 325 may be reported on a wideband basis and/or sub-band basis (sub-band basis shown in the first CSI report 320-*a*). Further, similar to wideband/sub-band CQIs 325 in the frequency domain, the UE 115-*a* may be configured to indicate whether CQIs 325 apply to one time interval or sub-window (e.g., short-term CQI reporting), or multiple time intervals/sub-windows (e.g., long-term CQI reporting).

In additional or alternative implementations, the control signaling 310 may indicate (and/or the UE 115-*b* may autonomously select) an interpolation function for mapping CQIs 325 to respective time/frequency resources. For example, as shown in FIG. 3, the second CSI report 320-*b* may include a set of CQIs 325-*b* that are separated in time/frequency according to an interpolation function associated with intermediate points. In other words, an interpolation function may indicate which time/frequency resources are to be reported with a CQI 325, where only the highlighted CQIs 325 are reported (e.g., CQI (x,y), x∈X and y∈Y). In some aspects, one or more interpolation functions may be specified or configured for the time domain and the frequency domain, either separately or jointly (e.g., single interpolation function for time and frequency domain mapping, or separate interpolation functions for time domain mapping and frequency domain mapping, respectively).

In some implementations, the interpolation function (e.g., values of x and y) may be preconfigured by the network and/or signaled via the control signaling 310. In additional or alternative implementations, the UE 115-*b* may select the interpolation function that will be used to generate the CSI report 320-*b* (e.g., select values of x and y for the set of CQIs 325-*b*), and may indicate the selected interpolation function to the network entity 105-*b* via the CSI report 320-*b*.

Continuing with reference to the wireless communications system 300 illustrated in FIG. 3, the UE 115-*a* may receive a set of reference signals 315 (e.g., CSI-RSs) from the network entity 105-*a*. In some cases, the set of reference signals 315 may be transmitted/received within the set of resources for CSI reporting indicated via the control signaling 310.

The UE 115-*a* may perform measurements for the set of reference signals 315. The measurements may include, but are not limited to, reference signal received power (RSRP) measurements, reference signal received quality (RSRQ) measurements, received signal strength indicator (RSSI) measurements, SNR measurements, SINR measurements, CQI measurements, or any combination thereof. In particular, the UE 115-*a* may be configured to perform measurements based on the one or more CSI codebook parameters indicated via the control signaling 310. In other words, the UE 115-*a* may perform measurements with respect to the spatial/frequency/time domains (with sufficient granularities) such that the UE 115-*a* will be able to determine CQIs 325 for a CSI report 320 in accordance with the codebook parameters. In some aspects, the UE 115-*a* may determine or generate a 3D coefficient matrix (e.g., $\widetilde{W}_{2,\ell}$) for a channel precoding matrix (e.g., $W^{(\ell)}$) based on the measurements.

Subsequently, the UE 115-*a* may generate a CSI report 320 (e.g., first CSI report 320-*a*, second CSI report 320-*b*) based on the measurements performed on the received reference signals 315, and may transmit the CSI report 320 to the network entity 105-*a*. Moreover, the UE 115-*a* may generate the CSI report 320 in accordance with the CSI codebook parameters configured by the network entity 105-*a*, in accordance with an interpolation function indicated by the network entity 105-*a* and/or selected by the UE 115-*a*, or any combination thereof.

Moreover, the UE 115-*a* may be configured to generate the CSI report 320 in accordance with the various other parameters/conditions indicated via the control signaling 310 at 405. For example, the first CSI report 320-*a* may indicate a reference CQI 325 and respective differential CQIs 325, where the differential CQIs 325 indicate differences in CQI 325 values to the reference CQI 325. In such cases, which CQI 325 is used as the reference CQI 325 may be signaled by the network (e.g., via the control signaling 310), defined by relevant standards, and/or determined based on one or more conditions (as described previously herein).

In some cases, the CSI report 320 may include multiple portions or parts. For example, the CSI report 320 may include a first part (e.g., CSI part 1) and a second part (e.g., CSI part 2). In some aspects, a priority rule may be defined or signaled, where the priority rule indicates when differential/multiple CQI reporting over time is configured, and/or which CQIs 325 are reported within which CSI parts/portions. For example, a priority rule may indicate that long-term CQI 325 (e.g., a reference CQI 325) has higher priority, and is therefore reported in CSI part 1, while short-term CQIs 325 (e.g., differential/additional CQIs 325) may be reported in CSI parts 2 or 3. By way of another example, a priority rule may indicate that x quantity of the second set of CQIs 325-*b* are to be reported in CSI part 1, while remaining CQIs 325 of the second set of CQIs 325-*b* are to be reported in CSI part 2. In some aspects, the one or more priority rules used to generate the CSI report 320 may be preconfigured by the network, indicated via the control signaling 310, or both.

In some aspects, the network entity 105-*a* may be configured to determine one or more instantaneous CQIs based on the set of CQIs 325 (e.g., first set of CQIs 325-a, second set of CQIs 325-b) indicated via the CSI report 320. Stated differently, in cases where single or multiple CQIs 325 are reported via a single CSI report 320, the network entity 105-a may be configured with one or more rules for how to interpret the respective CQIs 325.

For example, in some cases, the CSI report 320 may indicate minimum, maximum, and/or average CQIs 325, where the network entity 105-a is configured to determine an instantaneous CQI based on the reported CQIs 325 and the fluctuation of the reported bases/coefficients. Additionally, or alternatively, the network entity 105-a may determine the instantaneous CQI based on the PMI reported via the CSI report 320 (e.g., across the time domain and sub-bands of the frequency domain). In some implementations, the proposed CQI 325 (e.g., maximum, minimum, average CQIs 325) may be reported via the CSI report 320 when the codebook parameter reportQuantity is set to "cri-RI-PMI-CQI" or "cri-RI-LI-PMI-CQI."

In some aspects, the network entity 105-a may schedule communications at the UE 115-a based on the received CSI report 320 and/or determined instantaneous CQI. In particular, the network entity 105-a may perform channel estimation based on the received CSI report 320/instantaneous CQIs 325, and may schedule communications with the UE 115-a based on the received CSI report 320 and corresponding channel estimation. Subsequently, the UE 115-a and the network entity 105-a may communicate with one another (e.g., perform communications that were scheduled based on the CSI report 320).

Techniques described herein may facilitate CSI reporting with respect to the spatial, frequency, and Doppler (time) domains. In particular, techniques described herein may enable the UE 115-a to report how CQI 325 values change with respect to the spatial, frequency, and time domains. As such, aspects of the present disclosure may enable the UE 115-a to indicate how a relative quality of a channel changes over time, as well as how the quality of channel changes within different frequency bands and/or spatial resources. By enabling the UE 115-a to report how CQI 325 values have changed (or are expected to change) over time, aspects of the present disclosure may facilitate more complete and comprehensive channel estimation, which may enable the network to schedule wireless communications more effectively, leading to a more efficient use of resources and more reliable wireless communications.

Figure 4:
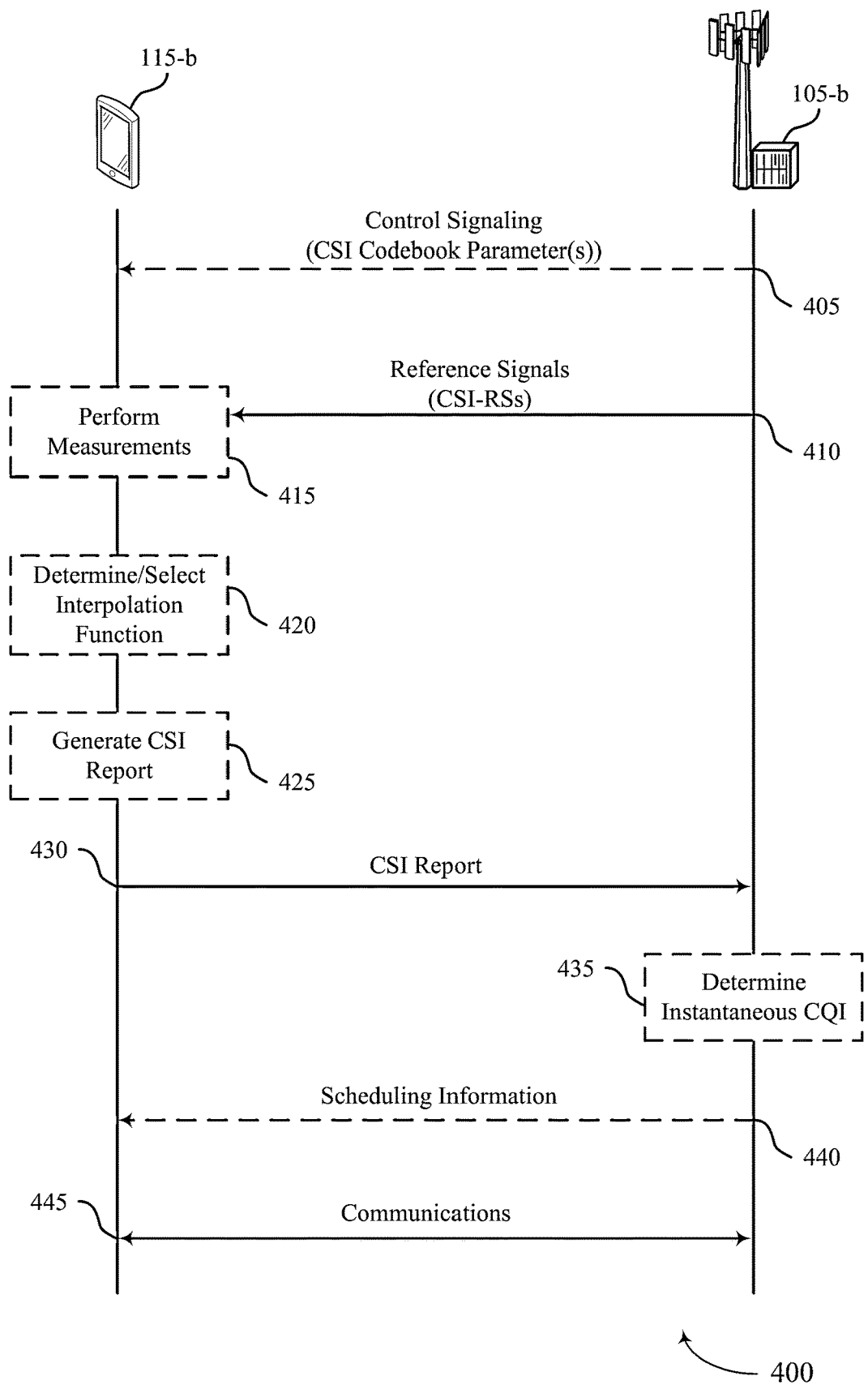
FIG. 4 illustrates an example of a process flow that supports techniques for channel quality information reporting in accordance with one or more aspects of the present disclosure.

FIG. 4 illustrates an example of a process flow 400 that supports techniques for channel quality information reporting in accordance with one or more aspects of the present disclosure. Aspects of the process flow 400 may implement, or be implemented by, aspects of the wireless communications system 100, the CSI reporting configuration 200, the wireless communications system 300, or any combination thereof. For example, process flow 400 illustrates 3D CSI reporting techniques that enable a UE 115-b to report multiple CQI values for different time intervals, as described herein.

The process flow 400 includes a UE 115-b and a network entity 105-b, which may be examples of wireless devices as described herein. For example, the UE 115-b and the network entity 105-b illustrated in FIG. 4 may include examples of the UE 115-a and the network entity 105-a, respectively, as illustrated in FIG. 3.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the UE 115-b may receive control signaling (e.g., RRC, DCI, MAC-CE) from the network entity 105-b, where the control signaling indicates one or more codebook parameters usable for generating CSI reports that include multiple CQIs (e.g., CSI reporting codebook parameters). In other words, the control signaling may indicate a CSI reporting configuration including codebook parameters for generating 3D CSI reports (e.g., CSI reports that indicate CQIs with respect to the spatial, frequency, and/or time/Doppler domain).

In some aspects, the one or more codebook parameters may determine how many CQIs (n) that the UE 115-b is to report within the CSI report (e.g., how many CQIs reported relative to the time domain, how many CQIs reported relative to the frequency domain, how many CQIs to report per transmission layer, and the like). For example, the one or more codebook parameters may include a size of a codebook associated with CSI reporting, a quantity of bases for CSI reporting, a type of bases for CSI reporting, or any combination thereof.

In some aspects, the control signaling may further indicate a set of resources that are to be measured by the UE 115-b for CSI reporting. For example, set of resources may span a set of time resources in the time domain, and a set of frequency resources in the frequency domain, where the control signaling indicates a length of the set of time resources in the time domain, a quantity of time intervals included within the of the set of time resources (e.g., how many CQIs are to be reported for different time intervals of the set of time resources), or both. In other words, the control signaling may indicate parameters associated with the resources to be used for CSI reporting, such as a length of the time-domain bases ($N_4$), a quantity of time intervals (m) (e.g., sub-windows) included within the set of time resources, a quantity of time-domain bases (Q), a type of bases associated with the CSI report to be generated by the UE 115-b, or any combination thereof. Such indications (e.g., $N_4$, m, Q) may include CSI codebook parameters that will be used to generate the CSI report.

In some aspects, the control signaling may indicate additional and/or alternative parameters or conditions associated with CSI reporting to be performed by the UE 115-b. Other parameters/conditions associated with CSI reporting that may be indicated via the control signaling may include, but are not limited to, conditions for selecting which CQI will serve as a reference CQI, an interpolation function for selecting/generating CQIs that will be reported via a CSI report, resources for transmitting a CSI report, and the like.

At 410, the UE 115-b may receive a set of reference signals (e.g., CSI-RSs) from the network entity 105-b. In some cases, the set of reference signals may be transmitted/received within the set of resources for CSI reporting indicated via the control signaling at 405.

At 415, the UE 115-b may perform measurements for the set of reference signals received at 410. The measurements may include, but are not limited to, RSRP measurements, RSRQ measurements, RSSI measurements, SNR measurements, SINR measurements, CQI measurements, or any combination thereof. In particular, the UE 115-b may be configured to perform measurements based on the one or more CSI codebook parameters indicated via the control signaling at 405. In other words, the UE 115-*b* may perform measurements with respect to the spatial/frequency/time domains (with sufficient granularities) such that the UE 115-*b* will be able to determine CQIs for a CSI report in accordance with the codebook parameters. In some aspects, the UE 115-*b* may determine or generate a 3D coefficient matrix (e.g., $\tilde{W}_{2,\ell}$) for a channel precoding matrix (e.g., $W^{(\ell)}$) based on the measurements.

At 420, the UE 115-*b* may determine or select an interpolation function that will be used to generate the CSI report. As described previously herein, the interpolation function may indicate mappings for how the UE 115-*b* is to report CQIs across the set of resources measured at 415. That is, the interpolation function may map reported CQIs to respective time intervals (and/or respective frequency bands) of the set of resources used to receive the reference signals. In other words, the interpolation function may be used to determine which CQIs correspond to which subsets of time/frequency resources (and/or which subsets of spatial resources for 3D reporting).

In some cases, the interpolation function may be indicated by the network entity 105-*b* via the control signaling at 405. In additional or alternative implementations, the UE 115-*b* may be configured to select the interpolation function that will be used (without explicit or implicit signaling from the network entity 105-*b*).

At 425, the UE 115-*b* may generate a CSI report based on the measurements performed at 415. Moreover, the UE 115-*b* may generate the CSI report in accordance with the CSI codebook parameters configured by the network entity 105-*b* at 405, and in accordance with the interpolation function which was determined/selected at 420.

In some aspects, the CSI report may include a set of multiple CQIs that are collectively associated with the set of time resources used to receive the reference signals at 410. In particular, the CSI report may include multiple CQIs for multiple time intervals across the set of time resources used to receive the reference signals. In other words, the CSI report may indicate how CQI changes over the set of time resources. Moreover, the CSI report may include CQIs for one or more frequency bands within the set of frequency resources used to receive the reference signals (e.g., how CQI changes over the set of frequency resources).

Moreover, the UE 115-*b* may be configured to generate the CSI report in accordance with the various other parameters/conditions indicated via the control signaling at 405. For example, in some cases, the CSI report may indicate a reference CQI and respective differential CQIs, where the differential CQIs indicate differences in CQI values to the reference CQI. In such cases, which CQI is used as the reference CQI may be signaled by the network (e.g., via the control signaling), defined by relevant standards, and/or determined based on one or more conditions. For example, the reference CQI may include an average CQI across the set of time and/or frequency resources used to receive the set of reference signals. By way of another example, the reference CQI may be associated with an initial time interval and/or initial frequency band of the set of resources used to receive the reference signals. By way of yet another example, the reference CQI may include the highest or lowest CQI reported within the CSI report (where the remaining differential CQIs are measured relative to the highest/lowest CQI).

In some cases, the CSI report may include multiple portions or parts. For example, the CSI report may include a first part (e.g., CSI part 1) and a second part (e.g., CSI part 2). As described previously herein, the respective portions/parts of the CSI reports may be used to indicate subsets of the reported CQIs.

At 430, the UE 115-*b* may transmit the CSI report generated at 425 to the network entity 105-*b*, where the CSI report indicates the set of CQIs. As such, the UE 115-*b* may transmit the CSI report at 430 based on receiving the control signaling at 405, receiving the reference signals at 410, performing the measurements at 415, determining/selecting the interpolation function at 420, generating the CSI report at 425, or any combination thereof.

In cases where the UE 115-*b* selects the interpolation function at 420 (e.g., without explicit signaling from the network), the UE 115-*b* may indicate the selected interpolation function via the CSI report. By indicating the interpolation function that was used to generate the CSI report, the network entity 105-*b* may be able to determine which reported CQIs correspond to which time intervals/frequency bands.

Moreover, as described previously herein, the CSI report may include a first portion (e.g., CSI part 1) and a second portion (e.g., CSI part 2). In some cases, the respective portions/parts of the CSI report may include or indicate different subsets of the reported CQIs. For example, UE 115-*b* may transmit a first portion of the CSI report (e.g., CSI part 1) that indicates a first subset of CQIs, and a second portion of the CSI report that includes a second subset of CQIs. In some cases, the first/second subsets of CQIs (e.g., whether respective CQIs are indicated in CSI part 1 or 2) may be determined in accordance with one or more priority rules, which may be indicated via the control signaling at 405.

At 435, the network entity 105-*b* may determine one or more instantaneous CQIs associated with the set of resources used to communicate the reference signals at 410 and generate the CSI report at 425. The network entity 105-*b* may be configured to determine the one or more instantaneous CQIs based on the set of CQIs indicated via the CSI report received at 430.

At 440, the UE 115-*b* may receive, from the network entity 105-*b*, scheduling information for one or more communications to be performed between the respective devices. In some aspects, the network entity 105-*b* may transmit the scheduling information based on the CSI report received at 430, based on the instantaneous CQIs determined at 435, or both. In particular, the network entity 105-*b* may perform channel estimation based on the received CSI report/instantaneous CQIs, and may schedule communications with the UE 115-*b* based on the received CSI report and corresponding channel estimation.

At 445, the UE 115-*b* and the network entity 105-*b* may communicate with one another. That is the UE 115-*b* and the network entity 105-*b* may perform (e.g., transmit, receive) the one or more messages associated with the scheduling information at 440.

Techniques described herein may facilitate CSI reporting with respect to the spatial, frequency, and Doppler (time) domains. In particular, techniques described herein may enable the UE 115-*b* to report how CQI values change with respect to the spatial, frequency, and time domains. As such, aspects of the present disclosure may enable the UE 115-*b* to indicate how a relative quality of a channel changes over time, as well as how the quality of channel changes within different frequency bands and/or spatial resources. By enabling the UE 115-*b* to report how CQI values have changed (or are expected to change) over time, aspects of the present disclosure may facilitate more complete and comprehensive channel estimation, which may enable the network to schedule wireless communications more effectively, leading to a more efficient use of resources and more reliable wireless communications.

Figure 5:
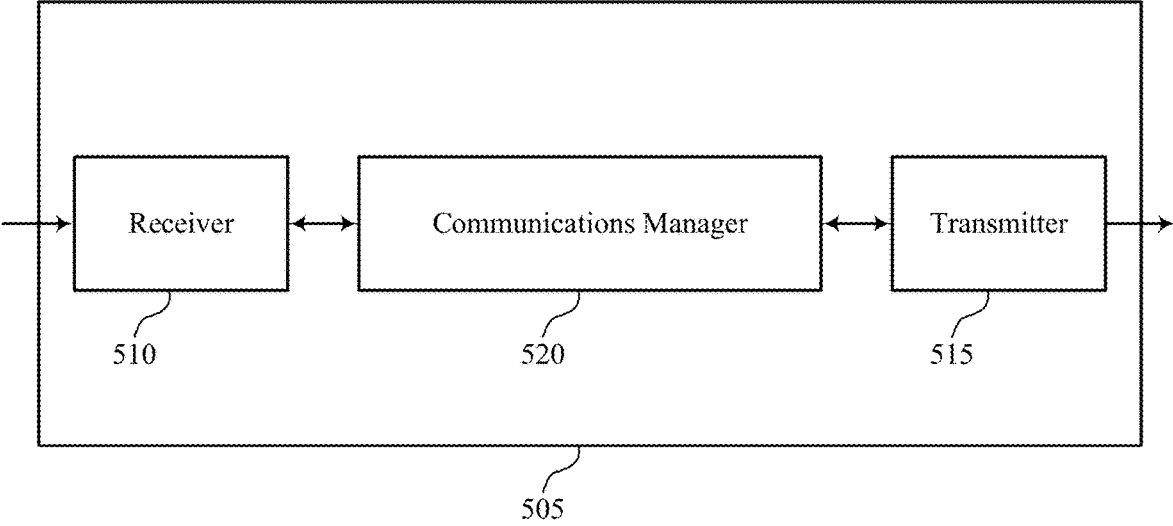
FIGS. 5 and 6 illustrate block diagrams of devices that support techniques for channel quality information reporting in accordance with one or more aspects of the present disclosure.

FIG. 5 illustrates a block diagram 500 of a device 505 that supports techniques for channel quality information reporting in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for channel quality information reporting). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for channel quality information reporting). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for channel quality information reporting as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain. The communications manager 520 may be configured as or otherwise support a means for receiving, from the network entity, a set of reference signals within the set of resources. The communications manager 520 may be configured as or otherwise support a means for performing measurements for the set of reference signals based on the one or more codebook parameters. The communications manager 520 may be configured as or otherwise support a means for generating a CSI report for the set of resources based on the measurements, the CSI report including a set of multiple CQIs that are collectively associated with a set of multiple time intervals within the set of time resources and one or more of a set of multiple frequency bands within the set of frequency resources. The communications manager 520 may be configured as or otherwise support a means for transmitting the CSI report to the network entity.

By including or configuring the communications manager 520 in accordance with examples as described herein, the device 505 (e.g., a processor controlling or otherwise coupled with the receiver 510, the transmitter 515, the communications manager 520, or a combination thereof) may support techniques that facilitate 3D CSI reporting with respect to the spatial, frequency, and Doppler (time) domains. In particular, techniques described herein may enable UEs 115 to report how CQI values change with respect to the spatial, frequency, and time domains. As such, aspects of the present disclosure may enable UEs 115 to indicate how a relative quality of a channel changes over time, as well as how the quality of channel changes within different frequency bands and/or spatial resources. By enabling UEs 115 to report how CQI values have changed (or are expected to change) over time, aspects of the present disclosure may facilitate more complete and comprehensive channel estimation, which may enable the network to schedule wireless communications more effectively, leading to a more efficient use of resources and more reliable wireless communications.

Figure 6:
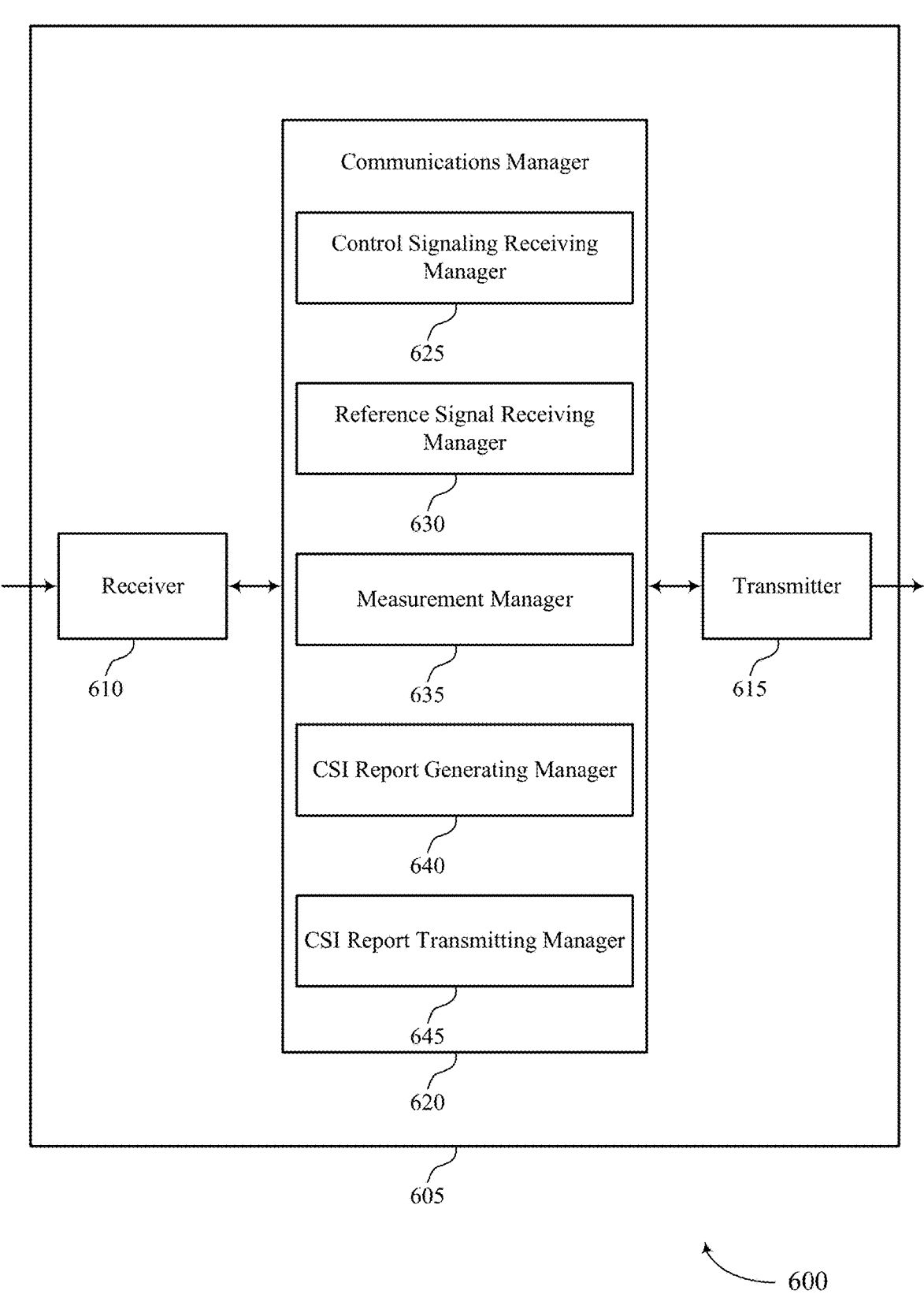

FIG. 6 illustrates a block diagram 600 of a device 605 that supports techniques for channel quality information reporting in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for channel quality information reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for channel quality information reporting). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for channel quality information reporting as described herein. For example, the communications manager 620 may include a control signaling receiving manager 625, a reference signal receiving manager 630, a measurement manager 635, a CSI report generating manager 640, a CSI report transmitting manager 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The control signaling receiving manager 625 may be configured as or otherwise support a means for receiving, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain. The reference signal receiving manager 630 may be configured as or otherwise support a means for receiving, from the network entity, a set of reference signals within the set of resources. The measurement manager 635 may be configured as or otherwise support a means for performing measurements for the set of reference signals based on the one or more codebook parameters. The CSI report generating manager 640 may be configured as or otherwise support a means for generating a CSI report for the set of resources based on the measurements, the CSI report including a set of multiple CQIs that are collectively associated with a set of multiple time intervals within the set of time resources and one or more of a set of multiple frequency bands within the set of frequency resources. The CSI report transmitting manager 645 may be configured as or otherwise support a means for transmitting the CSI report to the network entity.

Figure 7:
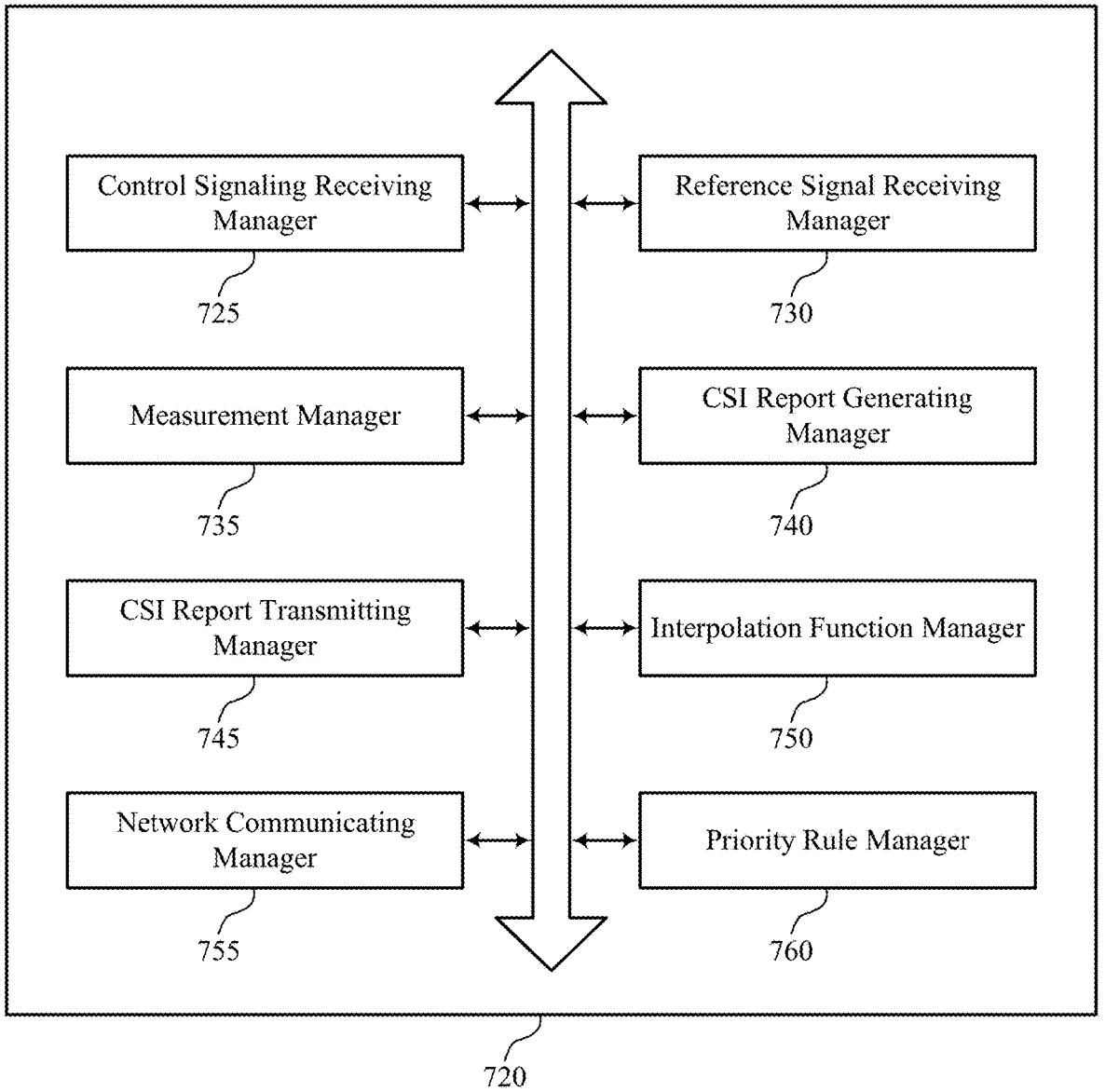
FIG. 7 illustrates a block diagram of a communications manager that supports techniques for channel quality information reporting in accordance with one or more aspects of the present disclosure.

FIG. 7 illustrates a block diagram 700 of a communications manager 720 that supports techniques for channel quality information reporting in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for channel quality information reporting as described herein. For example, the communications manager 720 may include a control signaling receiving manager 725, a reference signal receiving manager 730, a measurement manager 735, a CSI report generating manager 740, a CSI report transmitting manager 745, an interpolation function manager 750, a network communicating manager 755, a priority rule manager 760, or any combination thereof. Each of these components may communicate, directly or indirectly, with one another (e.g., via one or more buses).

The communications manager 720 may support wireless communication at a UE in accordance with examples as disclosed herein. The control signaling receiving manager 725 may be configured as or otherwise support a means for receiving, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain. The reference signal receiving manager 730 may be configured as or otherwise support a means for receiving, from the network entity, a set of reference signals within the set of resources. The measurement manager 735 may be configured as or otherwise support a means for performing measurements for the set of reference signals based on the one or more codebook parameters. The CSI report generating manager 740 may be configured as or otherwise support a means for generating a CSI report for the set of resources based on the measurements, the CSI report including a set of multiple CQIs that are collectively associated with a set of multiple time intervals within the set of time resources and one or more of a set of multiple frequency bands within the set of frequency resources. The CSI report transmitting manager 745 may be configured as or otherwise support a means for transmitting the CSI report to the network entity.

In some examples, to support transmitting the CSI report, the CSI report transmitting manager 745 may be configured as or otherwise support a means for transmitting the CSI report including a reference CQI of the set of multiple CQIs, where a remaining set of CQIs of the set of multiple CQIs include differential CQIs indicating differences in channel quality relative to the reference CQI.

In some examples, the reference CQI includes an average CQI associated with the set of multiple time intervals, the set of multiple frequency bands, or both. In some examples, the reference CQI is associated with an initial time interval of the set of multiple time intervals, an initial frequency band of the set of multiple frequency bands, or both. In some examples, the reference CQI includes a highest CQI of the set of multiple CQIs, a lowest CQI of the set of multiple CQIs, or both.

In some examples, the control signaling receiving manager 725 may be configured as or otherwise support a means for receiving, via the control signaling, an indication of one or more conditions for selecting the reference CQI, where generating the CSI report is based on the one or more conditions.

In some examples, to support generating the CSI report, the interpolation function manager 750 may be configured as or otherwise support a means for generating the CSI report in accordance with an interpolation function that maps the set of multiple CQIs to a subset of time intervals within the set of multiple time intervals, to a subset of frequency bands within the set of multiple frequency bands, or both.

In some examples, the interpolation function manager 750 may be configured as or otherwise support a means for receiving, via the control signaling, an indication of the interpolation function, where generating the CSI report is based on receiving the indication of the interpolation function. In some examples, the interpolation function manager 750 may be configured as or otherwise support a means for transmitting, via the CSI report, an indication of the interpolation function used by the UE to generate the CSI report.

In some examples, a quantity of CQIs of the set of multiple CQIs that correspond to the set of multiple time intervals is based on the one or more codebook parameters. In some examples, the one or more codebook parameters include a size of a codebook associated with CSI reporting, a quantity of time-domain bases associated with the CSI report, a type of bases associated with the CSI report, or any combination thereof.

In some examples, the control signaling receiving manager 725 may be configured as or otherwise support a means for receiving, via the control signaling, an indication of a length of the set of time resources in the time domain, a quantity of time intervals included within the set of multiple time intervals of the set of time resources, or both, where the one or more codebook parameters include the length, the quantity of time intervals, or both.

In some examples, the CSI report transmitting manager 745 may be configured as or otherwise support a means for transmitting a first portion of the CSI report including a first subset of CQIs of the set of multiple CQIs. In some examples, the CSI report transmitting manager 745 may be configured as or otherwise support a means for transmitting a second portion of the CSI report including a second subset of CQIs of the set of multiple CQIs, where the first subset of CQIs and the second subset of CQIs are determined in accordance with one or more priority rules.

In some examples, the priority rule manager 760 may be configured as or otherwise support a means for receiving, via the control signaling, an indication of the one or more priority rules, where generating the CSI report is based on receiving the indication of the one or more priority rules.

In some examples, the network communicating manager 755 may be configured as or otherwise support a means for receiving scheduling information for one or more communications between the UE and the network entity based on the CSI report. In some examples, the network communicating manager 755 may be configured as or otherwise support a means for performing the one or more communications with the network entity based on the scheduling information.

Figure 8:
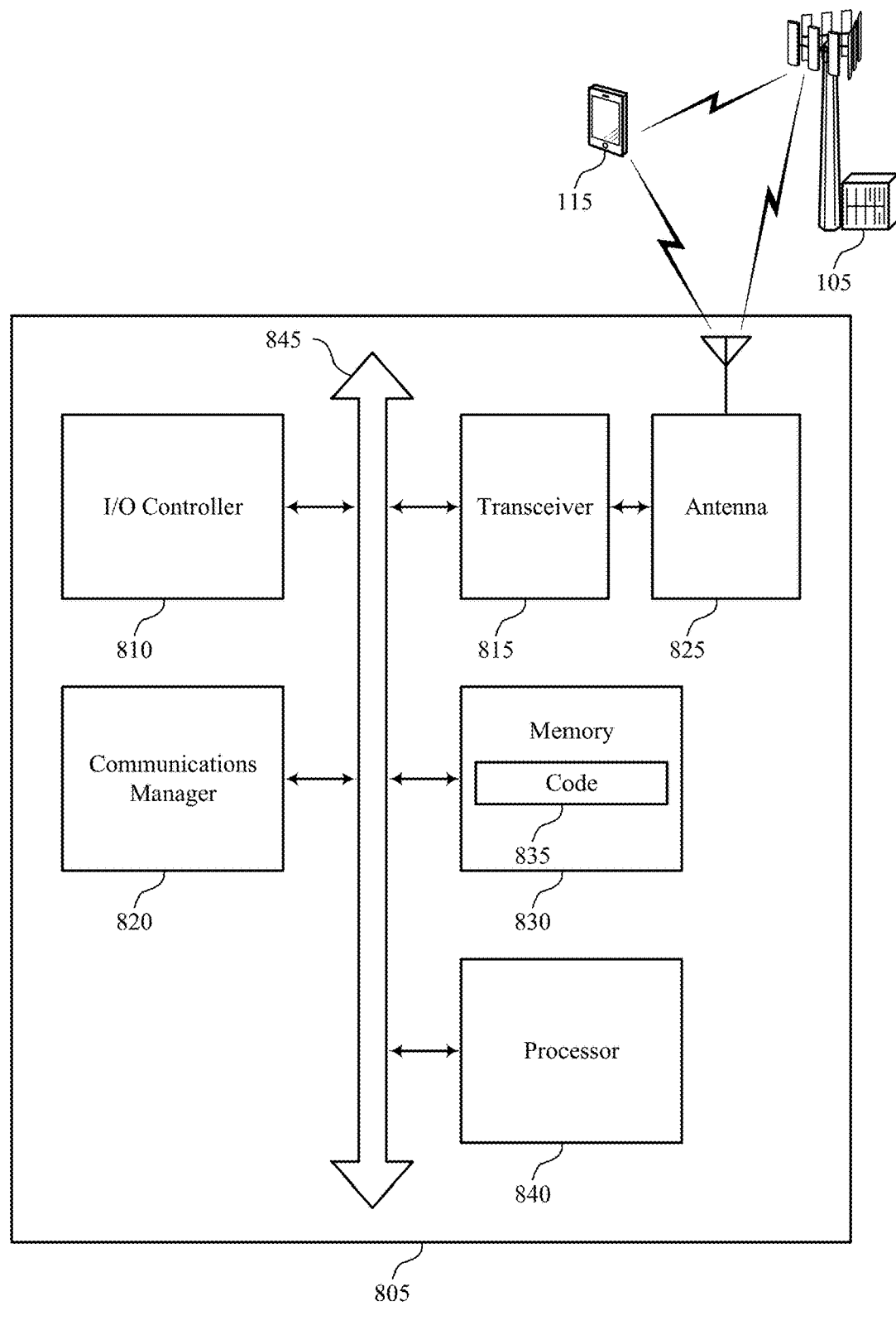
FIG. 8 illustrates a diagram of a system including a device that supports techniques for channel quality information reporting in accordance with one or more aspects of the present disclosure.

FIG. 8 illustrates a diagram of a system 800 including a device 805 that supports techniques for channel quality information reporting in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for channel quality information reporting). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain. The communications manager 820 may be configured as or otherwise support a means for receiving, from the network entity, a set of reference signals within the set of resources. The communications manager 820 may be configured as or otherwise support a means for performing measurements for the set of reference signals based on the one or more codebook parameters. The communications manager 820 may be configured as or otherwise support a means for generating a CSI report for the set of resources based on the measurements, the CSI report including a set of multiple CQIs that are collectively associated with a set of multiple time intervals within the set of time resources and one or more of a set of multiple frequency bands within the set of frequency resources. The communications manager 820 may be configured as or otherwise support a means for transmitting the CSI report to the network entity.

By including or configuring the communications manager 820 in accordance with examples as described herein, the device 805 may support techniques that facilitate 3D CSI reporting with respect to the spatial, frequency, and Doppler (time) domains. In particular, techniques described herein may enable UEs 115 to report how CQI values change with respect to the spatial, frequency, and time domains. As such, aspects of the present disclosure may enable UEs 115 to indicate how a relative quality of a channel changes over time, as well as how the quality of channel changes within different frequency bands and/or spatial resources. By enabling UEs 115 to report how CQI values have changed (or are expected to change) over time, aspects of the present disclosure may facilitate more complete and comprehensive channel estimation, which may enable the network to schedule wireless communications more effectively, leading to a more efficient use of resources and more reliable wireless communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for channel quality information reporting as described herein, or the processor 840 and the memory 830 may be otherwise configured to perform or support such operations.

Figure 9:
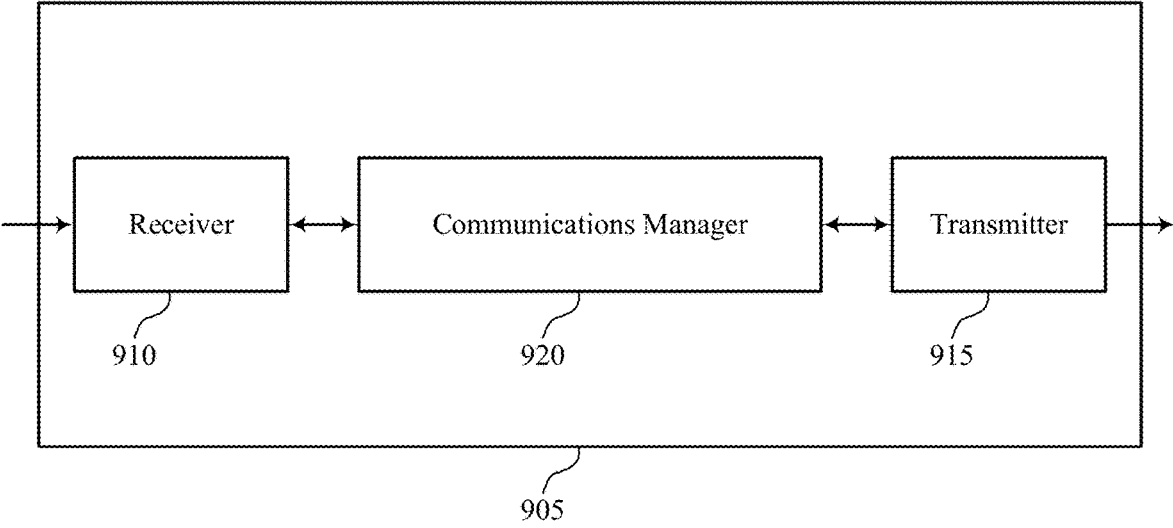
FIGS. 9 and 10 illustrate block diagrams of devices that support techniques for channel quality information reporting in accordance with one or more aspects of the present disclosure.

FIG. 9 illustrates a block diagram 900 of a device 905 that supports techniques for channel quality information reporting in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for channel quality information reporting as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a UE, control signaling that is indicative of one or more codebook parameters usable by the UE for generating CSI reports that include multiple CQIs, the control signaling further indicating a set of resources that span a set of time resources in a time domain and a set of frequency resources in a frequency domain. The communications manager 920 may be configured as or otherwise support a means for transmitting, to the UE, a set of reference signals within the set of resources. The communications manager 920 may be configured as or otherwise support a means for receiving a CSI report for the set of resources based on the set of reference signals, the CSI report including a set of multiple CQIs that are collectively associated with a set of multiple time intervals within the set of time resources and one or more of a set of multiple frequency bands within the set of frequency resources.

By including or configuring the communications manager 920 in accordance with examples as described herein, the device 905 (e.g., a processor controlling or otherwise coupled with the receiver 910, the transmitter 915, the communications manager 920, or a combination thereof) may support techniques that facilitate 3D CSI reporting with respect to the spatial, frequency, and Doppler (time) domains. In particular, techniques described herein may enable UEs 115 to report how CQI values change with respect to the spatial, frequency, and time domains. As such, aspects of the present disclosure may enable UEs 115 to indicate how a relative quality of a channel changes over time, as well as how the quality of channel changes within different frequency bands and/or spatial resources. By enabling UEs 115 to report how CQI values have changed (or are expected to change) over time, aspects of the present disclosure may facilitate more complete and comprehensive channel estimation, which may enable the network to schedule wireless communications more effectively, leading to a more efficient use of resources and more reliable wireless communications.

Figure 10:
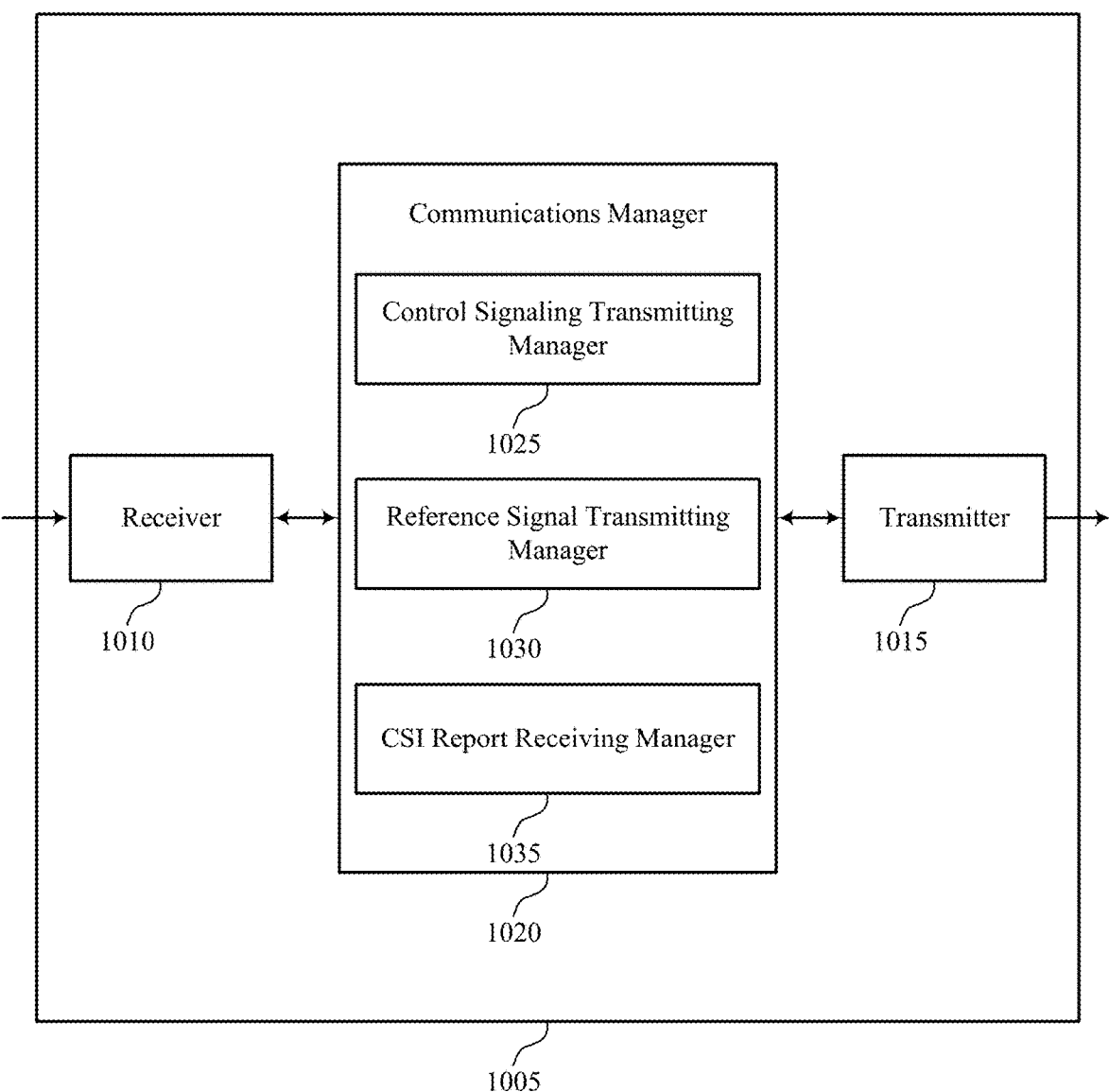

FIG. 10 illustrates a block diagram 1000 of a device 1005 that supports techniques for channel quality information reporting in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for channel quality information reporting as described herein. For example, the communications manager 1020 may include a control signaling transmitting manager 1025, a reference signal transmitting manager 1030, a CSI report receiving manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The control signaling transmitting manager 1025 may be configured as or otherwise support a means for transmitting, to a UE, control signaling that is indicative of one or more codebook parameters usable by the UE for generating CSI reports that include multiple CQIs, the control signaling further indicating a set of resources that span a set of time resources in a time domain and a set of frequency resources in a frequency domain. The reference signal transmitting manager 1030 may be configured as or otherwise support a means for transmitting, to the UE, a set of reference signals within the set of resources. The CSI report receiving manager 1035 may be configured as or otherwise support a means for receiving a CSI report for the set of resources based on the set of reference signals, the CSI report including a set of multiple CQIs that are collectively associated with a set of multiple time intervals within the set of time resources and one or more of a set of multiple frequency bands within the set of frequency resources.

Figure 11:
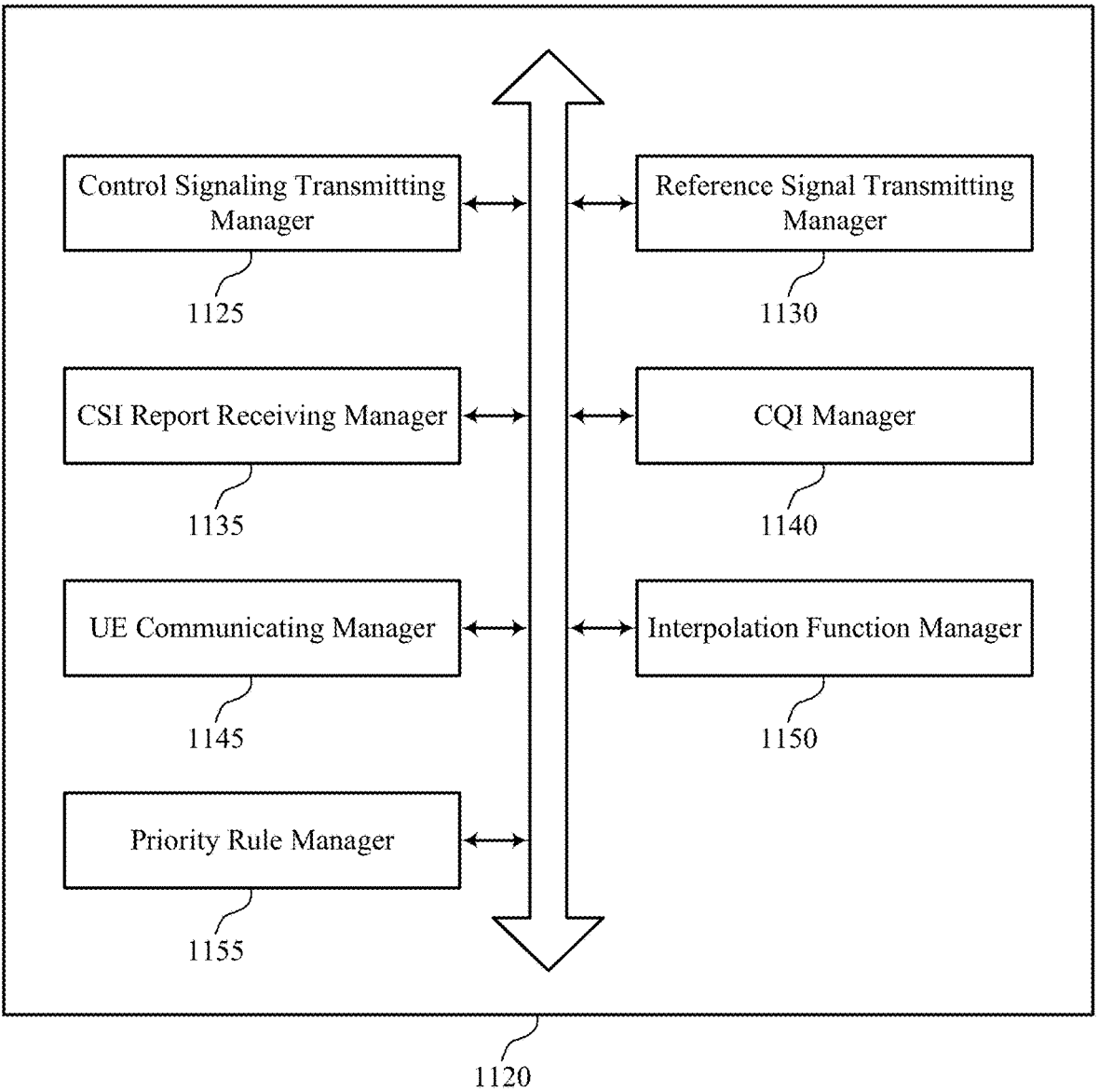
FIG. 11 illustrates a block diagram of a communications manager that supports techniques for channel quality information reporting in accordance with one or more aspects of the present disclosure.

FIG. 11 illustrates a block diagram 1100 of a communications manager 1120 that supports techniques for channel quality information reporting in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for channel quality information reporting as described herein. For example, the communications manager 1120 may include a control signaling transmitting manager 1125, a reference signal transmitting manager 1130, a CSI report receiving manager 1135, a CQI manager 1140, a UE communicating manager 1145, an interpolation function manager 1150, a priority rule manager 1155, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The control signaling transmitting manager 1125 may be configured as or otherwise support a means for transmitting, to a UE, control signaling that is indicative of one or more codebook parameters usable by the UE for generating CSI reports that include multiple CQIs, the control signaling further indicating a set of resources that span a set of time resources in a time domain and a set of frequency resources in a frequency domain. The reference signal transmitting manager 1130 may be configured as or otherwise support a means for transmitting, to the UE, a set of reference signals within the set of resources. The CSI report receiving manager 1135 may be configured as or otherwise support a means for receiving a CSI report for the set of resources based on the set of reference signals, the CSI report including a set of multiple CQIs that are collectively associated with a set of multiple time intervals within the set of time resources and one or more of a set of multiple frequency bands within the set of frequency resources.

In some examples, to support receiving the CSI report, the CSI report receiving manager 1135 may be configured as or otherwise support a means for receiving the CSI report including a reference CQI of the set of multiple CQIs, where a remaining set of CQIs of the set of multiple CQIs include differential CQIs indicating differences in channel quality relative to the reference CQI.

In some examples, the reference CQI includes an average CQI associated with the set of multiple time intervals, the set of multiple frequency bands, or both. In some examples, the reference CQI is associated with an initial time interval of the set of multiple time intervals, an initial frequency band of the set of multiple frequency bands, or both. In some examples, the reference CQI includes a highest CQI of the set of multiple CQIs, a lowest CQI of the set of multiple CQIs, or both.

In some examples, the control signaling transmitting manager 1125 may be configured as or otherwise support a means for transmitting, via the control signaling, an indication of one or more conditions for selecting the reference CQI, where receiving the CSI report is based on the one or more conditions. In some examples, the CSI report is based on an interpolation function that maps the set of multiple CQIs to a subset of time intervals within the set of multiple time intervals, to a subset of frequency bands within the set of multiple frequency bands, or both.

In some examples, the interpolation function manager 1150 may be configured as or otherwise support a means for transmitting, via the control signaling, an indication of the interpolation function, where receiving the CSI report is based on transmitting the indication of the interpolation function. In some examples, the interpolation function manager 1150 may be configured as or otherwise support a means for receiving, via the CSI report, an indication of the interpolation function used by the UE to generate the CSI report.

In some examples, a quantity of CQIs of the set of multiple CQIs that correspond to the set of multiple time intervals is based on the one or more codebook parameters. In some examples, the one or more codebook parameters include a size of a codebook associated with CSI reporting, a quantity of time-domain bases associated with the CSI report, a type of bases associated with the CSI report, or any combination thereof.

In some examples, the control signaling transmitting manager 1125 may be configured as or otherwise support a means for transmitting, via the control signaling, an indication of a length of the set of time resources in the time domain, a quantity of time intervals included within the set of multiple time intervals of the set of time resources, or both, where the one or more codebook parameters include the length, the quantity of time intervals, or both.

In some examples, the CQI manager 1140 may be configured as or otherwise support a means for determining one or more instantaneous CQIs associated with the set of multiple time intervals, the set of multiple frequency bands, or both, based on the set of multiple CQIs included within the CSI report. In some examples, the UE communicating manager 1145 may be configured as or otherwise support a means for transmitting scheduling information for one or more communications between the UE and the network entity based on the one or more instantaneous CQIs. In some examples, the UE communicating manager 1145 may be configured as or otherwise support a means for performing the one or more communications with the UE based on the scheduling information.

In some examples, the CSI report receiving manager 1135 may be configured as or otherwise support a means for receiving a first portion of the CSI report including a first subset of CQIs of the set of multiple CQIs. In some examples, the CSI report receiving manager 1135 may be configured as or otherwise support a means for receiving a second portion of the CSI report including a second subset of CQIs of the set of multiple CQIs, where the first subset of CQIs and the second subset of CQIs are determined in accordance with one or more priority rules.

In some examples, the priority rule manager 1155 may be configured as or otherwise support a means for transmitting, via the control signaling, an indication of the one or more priority rules, where generating the CSI report is based on receiving the indication of the one or more priority rules.

Figure 12:
FIG. 12 illustrates a diagram of a system including a device that supports techniques for channel quality information reporting in accordance with one or more aspects of the present disclosure.

FIG. 12 illustrates a diagram of a system 1200 including a device 1205 that supports techniques for channel quality information reporting in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for channel quality information reporting). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a UE, control signaling that is indicative of one or more codebook parameters usable by the UE for generating CSI reports that include multiple CQIs, the control signaling further indicating a set of resources that span a set of time resources in a time domain and a set of frequency resources in a frequency domain. The communications manager 1220 may be configured as or otherwise support a means for transmitting, to the UE, a set of reference signals within the set of resources. The communications manager 1220 may be configured as or otherwise support a means for receiving a CSI report for the set of resources based on the set of reference signals, the CSI report including a set of multiple CQIs that are collectively associated with a set of multiple time intervals within the set of time resources and one or more of a set of multiple frequency bands within the set of frequency resources.

By including or configuring the communications manager 1220 in accordance with examples as described herein, the device 1205 may support techniques that facilitate 3D CSI reporting with respect to the spatial, frequency, and Doppler (time) domains. In particular, techniques described herein may enable UEs 115 to report how CQI values change with respect to the spatial, frequency, and time domains. As such, aspects of the present disclosure may enable UEs 115 to indicate how a relative quality of a channel changes over time, as well as how the quality of channel changes within different frequency bands and/or spatial resources. By enabling UEs 115 to report how CQI values have changed (or are expected to change) over time, aspects of the present disclosure may facilitate more complete and comprehensive channel estimation, which may enable the network to schedule wireless communications more effectively, leading to a more efficient use of resources and more reliable wireless communications.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for channel quality information reporting as described herein, or the processor 1235 and the memory 1225 may be otherwise configured to perform or support such operations.

FIG. 13 illustrates a flowchart showing a method 1300 that supports techniques for channel quality information reporting in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain. The operations of 1305 may be performed in accordance with examples as disclosed herein. In some examples, aspects of the operations of 1305 may be performed by a control signaling receiving manager 725 as described with reference to FIG. 7.

At 1310, the method may include receiving, from the network entity, a set of reference signals within the set of resources. The operations of 1310 may be performed in accordance with examples as disclosed herein. In some examples, aspects of the operations of 1310 may be performed by a reference signal receiving manager 730 as described with reference to FIG. 7.

At 1315, the method may include performing measurements for the set of reference signals based on the one or more codebook parameters. The operations of 1315 may be performed in accordance with examples as disclosed herein. In some examples, aspects of the operations of 1315 may be performed by a measurement manager 735 as described with reference to FIG. 7.

At 1320, the method may include generating a CSI report for the set of resources based on the measurements, the CSI report including a set of multiple CQIs that are collectively associated with a set of multiple time intervals within the set of time resources and one or more of a set of multiple frequency bands within the set of frequency resources. The operations of 1320 may be performed in accordance with examples as disclosed herein. In some examples, aspects of the operations of 1320 may be performed by a CSI report generating manager 740 as described with reference to FIG. 7.

At 1325, the method may include transmitting the CSI report to the network entity. The operations of 1325 may be performed in accordance with examples as disclosed herein. In some examples, aspects of the operations of 1325 may be performed by a CSI report transmitting manager 745 as described with reference to FIG. 7.

FIG. 14 illustrates a flowchart showing a method 1400 that supports techniques for channel quality information reporting in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain. The operations of 1405 may be performed in accordance with examples as disclosed herein. In some examples, aspects of the operations of 1405 may be performed by a control signaling receiving manager 725 as described with reference to FIG. 7.

At 1410, the method may include receiving, from the network entity, a set of reference signals within the set of resources. The operations of 1410 may be performed in accordance with examples as disclosed herein. In some examples, aspects of the operations of 1410 may be performed by a reference signal receiving manager 730 as described with reference to FIG. 7.

At 1415, the method may include performing measurements for the set of reference signals based on the one or more codebook parameters. The operations of 1415 may be performed in accordance with examples as disclosed herein. In some examples, aspects of the operations of 1415 may be performed by a measurement manager 735 as described with reference to FIG. 7.

At 1420, the method may include generating a CSI report for the set of resources based on the measurements, the CSI report including a set of multiple CQIs that are collectively associated with a set of multiple time intervals within the set of time resources and one or more of a set of multiple frequency bands within the set of frequency resources. The operations of 1420 may be performed in accordance with examples as disclosed herein. In some examples, aspects of the operations of 1420 may be performed by a CSI report generating manager 740 as described with reference to FIG. 7.

At 1425, the method may include transmitting the CSI report including a reference CQI of the set of multiple CQIs, where a remaining set of CQIs of the set of multiple CQIs include differential CQIs indicating differences in channel quality relative to the reference CQI. The operations of 1425 may be performed in accordance with examples as disclosed herein. In some examples, aspects of the operations of 1425 may be performed by a CSI report transmitting manager 745 as described with reference to FIG. 7.

FIG. 15 illustrates a flowchart showing a method 1500 that supports techniques for channel quality information reporting in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain. The operations of 1505 may be performed in accordance with examples as disclosed herein. In some examples, aspects of the operations of 1505 may be performed by a control signaling receiving manager 725 as described with reference to FIG. 7.

At 1510, the method may include receiving, from the network entity, a set of reference signals within the set of resources. The operations of 1510 may be performed in accordance with examples as disclosed herein. In some examples, aspects of the operations of 1510 may be performed by a reference signal receiving manager 730 as described with reference to FIG. 7.

At 1515, the method may include performing measurements for the set of reference signals based on the one or more codebook parameters. The operations of 1515 may be performed in accordance with examples as disclosed herein. In some examples, aspects of the operations of 1515 may be performed by a measurement manager 735 as described with reference to FIG. 7.

At 1520, the method may include generating a CSI report for the set of resources based on the measurements, the CSI report including a set of multiple CQIs that are collectively associated with a set of multiple time intervals within the set of time resources and one or more of a set of multiple frequency bands within the set of frequency resources, where the CSI report is generated in accordance with an interpolation function that maps the set of multiple CQIs to a subset of time intervals within the set of multiple time intervals, to a subset of frequency bands within the set of multiple frequency bands, or both. The operations of 1520 may be performed in accordance with examples as disclosed herein. In some examples, aspects of the operations of 1520 may be performed by a CSI report generating manager 740 as described with reference to FIG. 7.

At 1525, the method may include transmitting the CSI report to the network entity. The operations of 1525 may be performed in accordance with examples as disclosed herein. In some examples, aspects of the operations of 1525 may be performed by a CSI report transmitting manager 745 as described with reference to FIG. 7.

At 1530, the method may include generating the CSI report in accordance with an interpolation function that maps the set of multiple CQIs to a subset of time intervals within the set of multiple time intervals, to a subset of frequency bands within the set of multiple frequency bands, or both. The operations of 1530 may be performed in accordance with examples as disclosed herein. In some examples, aspects of the operations of 1530 may be performed by an interpolation function manager 750 as described with reference to FIG. 7.

FIG. 16 illustrates a flowchart showing a method 1600 that supports techniques for channel quality information reporting in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, control signaling that is indicative of one or more codebook parameters usable by the UE for generating CSI reports that include multiple CQIs, the control signaling further indicating a set of resources that span a set of time resources in a time domain and a set of frequency resources in a frequency domain. The operations of 1605 may be performed in accordance with examples as disclosed herein. In some examples, aspects of the operations of 1605 may be performed by a control signaling transmitting manager 1125 as described with reference to FIG. 11.

At 1610, the method may include transmitting, to the UE, a set of reference signals within the set of resources. The operations of 1610 may be performed in accordance with examples as disclosed herein. In some examples, aspects of the operations of 1610 may be performed by a reference signal transmitting manager 1130 as described with reference to FIG. 11.

At 1615, the method may include receiving a CSI report for the set of resources based on the set of reference signals, the CSI report including a set of multiple CQIs that are collectively associated with a set of multiple time intervals within the set of time resources and one or more of a set of multiple frequency bands within the set of frequency resources. The operations of 1615 may be performed in accordance with examples as disclosed herein. In some examples, aspects of the operations of 1615 may be performed by a CSI report receiving manager 1135 as described with reference to FIG. 11.

The following provides an overview of aspects of the present disclosure:

Aspect 1: A method for wireless communication at a UE, comprising: receiving, from a network entity, control signaling that is indicative of one or more codebook parameters usable by the UE for generating CSI reports that include multiple CQIs, the control signaling further indicating a set of resources that span a set of time resources in a time domain and a set of frequency resources in a frequency domain; receiving, from the network entity, a set of reference signals within the set of resources; performing measurements for the set of reference signals based at least in part on the one or more codebook parameters; generating a CSI report for the set of resources based at least in part on the measurements, the CSI report comprising a plurality of CQIs that are collectively associated with a plurality of time intervals within the set of time resources and one or more of a plurality of frequency bands within the set of frequency resources; and transmitting the CSI report to the network entity.

Aspect 2: The method of aspect 1, wherein transmitting the CSI report comprises: transmitting the CSI report comprising a reference CQI of the plurality of CQIs, wherein a remaining set of CQIs of the plurality of CQIs comprise differential CQIs indicating differences in channel quality relative to the reference CQI.

Aspect 3: The method of aspect 2, wherein the reference CQI comprises an average CQI associated with the plurality of time intervals, the plurality of frequency bands, or both.

Aspect 4: The method of any of aspects 2 through 3, wherein the reference CQI is associated with an initial time interval of the plurality of time intervals, an initial frequency band of the plurality of frequency bands, or both.

Aspect 5: The method of any of aspects 2 through 4, wherein the reference CQI comprises a highest CQI of the plurality of CQIs, a lowest CQI of the plurality of CQIs, or both.

Aspect 6: The method of any of aspects 2 through 5, further comprising: receiving, via the control signaling, an indication of one or more conditions for selecting the reference CQI, wherein generating the CSI report is based at least in part on the one or more conditions.

Aspect 7: The method of any of aspects 1 through 6, wherein generating the CSI report comprises: generating the CSI report in accordance with an interpolation function that maps the plurality of CQIs to a subset of time intervals within the plurality of time intervals, to a subset of frequency bands within the plurality of frequency bands, or both.

Aspect 8: The method of aspect 7, further comprising: receiving, via the control signaling, an indication of the interpolation function, wherein generating the CSI report is based at least in part on receiving the indication of the interpolation function.

Aspect 9: The method of any of aspects 7 through 8, further comprising: transmitting, via the CSI report, an indication of the interpolation function used by the UE to generate the CSI report.

Aspect 10: The method of any of aspects 1 through 9, wherein a quantity of CQIs of the plurality of CQIs that correspond to the plurality of time intervals is based at least in part on the one or more codebook parameters.

Aspect 11: The method of aspect 10, wherein the one or more codebook parameters comprise a size of a codebook associated with CSI reporting, a quantity of time-domain bases associated with the CSI report, a type of bases associated with the CSI report, or any combination thereof.

Aspect 12: The method of any of aspects 10 through 11, further comprising: receiving, via the control signaling, an indication of a length of the set of time resources in the time domain, a quantity of time intervals included within the plurality of time intervals of the set of time resources, or both, wherein the one or more codebook parameters comprise the length, the quantity of time intervals, or both.

Aspect 13: The method of any of aspects 1 through 12, further comprising: transmitting a first portion of the CSI report comprising a first subset of CQIs of the plurality of CQIs; and transmitting a second portion of the CSI report comprising a second subset of CQIs of the plurality of CQIs, wherein the first subset of CQIs and the second subset of CQIs are determined in accordance with one or more priority rules.

Aspect 14: The method of aspect 13, further comprising: receiving, via the control signaling, an indication of the one or more priority rules, wherein generating the CSI report is based at least in part on receiving the indication of the one or more priority rules.

Aspect 15: The method of any of aspects 1 through 14, further comprising: receiving scheduling information for one or more communications between the UE and the network entity based at least in part on the CSI report; and performing the one or more communications with the network entity based at least in part on the scheduling information.

Aspect 16: A method for wireless communication at a network entity, comprising: transmitting, to a UE, control signaling that is indicative of one or more codebook parameters usable by the UE for generating CSI reports that include multiple CQIs, the control signaling further indicating a set of resources that span a set of time resources in a time domain and a set of frequency resources in a frequency domain; transmitting, to the UE, a set of reference signals within the set of resources; and receiving a CSI report for the set of resources based at least in part on the set of reference signals, the CSI report comprising a plurality of CQIs that are collectively associated with a plurality of time intervals within the set of time resources and one or more of a plurality of frequency bands within the set of frequency resources.

Aspect 17: The method of aspect 16, wherein receiving the CSI report comprises: receiving the CSI report comprising a reference CQI of the plurality of CQIs, wherein a remaining set of CQIs of the plurality of CQIs comprise differential CQIs indicating differences in channel quality relative to the reference CQI.

Aspect 18: The method of aspect 17, wherein the reference CQI comprises an average CQI associated with the plurality of time intervals, the plurality of frequency bands, or both.

Aspect 19: The method of any of aspects 17 through 18, wherein the reference CQI is associated with an initial time interval of the plurality of time intervals, an initial frequency band of the plurality of frequency bands, or both.

Aspect 20: The method of any of aspects 17 through 19, wherein the reference CQI comprises a highest CQI of the plurality of CQIs, a lowest CQI of the plurality of CQIs, or both.

Aspect 21: The method of any of aspects 17 through 20, further comprising: transmitting, via the control signaling, an indication of one or more conditions for selecting the reference CQI, wherein receiving the CSI report is based at least in part on the one or more conditions.

Aspect 22: The method of any of aspects 16 through 21, wherein the CSI report is based at least in part on an interpolation function that maps the plurality of CQIs to a subset of time intervals within the plurality of time intervals, to a subset of frequency bands within the plurality of frequency bands, or both.

Aspect 23: The method of aspect 22, further comprising: transmitting, via the control signaling, an indication of the interpolation function, wherein receiving the CSI report is based at least in part on transmitting the indication of the interpolation function.

Aspect 24: The method of any of aspects 22 through 23, further comprising: receiving, via the CSI report, an indication of the interpolation function used by the UE to generate the CSI report.

Aspect 25: The method of any of aspects 16 through 24, wherein a quantity of CQIs of the plurality of CQIs that correspond to the plurality of time intervals is based at least in part on the one or more codebook parameters.

Aspect 26: The method of aspect 25, wherein the one or more codebook parameters comprise a size of a codebook associated with CSI reporting, a quantity of time-domain bases associated with the CSI report, a type of bases associated with the CSI report, or any combination thereof.

Aspect 27: The method of any of aspects 25 through 26, further comprising: transmitting, via the control signaling, an indication of a length of the set of time resources in the time domain, a quantity of time intervals included within the plurality of time intervals of the set of time resources, or both, wherein the one or more codebook parameters comprise the length, the quantity of time intervals, or both.

Aspect 28: The method of any of aspects 16 through 27, further comprising: determining one or more instantaneous CQIs associated with the plurality of time intervals, the plurality of frequency bands, or both, based at least in part on the plurality of CQIs included within the CSI report; transmitting scheduling information for one or more communications between the UE and the network entity based at least in part on the one or more instantaneous CQIs; and performing the one or more communications with the UE based at least in part on the scheduling information.

Aspect 29: The method of any of aspects 16 through 28, further comprising: receiving a first portion of the CSI report comprising a first subset of CQIs of the plurality of CQIs; and receiving a second portion of the CSI report comprising a second subset of CQIs of the plurality of CQIs, wherein the first subset of CQIs and the second subset of CQIs are determined in accordance with one or more priority rules.

Aspect 30: The method of aspect 29, further comprising: transmitting, via the control signaling, an indication of the one or more priority rules, wherein generating the CSI report is based at least in part on receiving the indication of the one or more priority rules.

Aspect 31: An apparatus for wireless communication at a UE, comprising a processor; memory coupled with the processor; and instructions stored in the memory and executable by the processor to cause the apparatus to perform a method of any of aspects 1 through 15.

Aspect 32: An apparatus for wireless communication at a UE, comprising at least one means for performing a method of any of aspects 1 through 15.

Aspect 33: A non-transitory computer-readable medium storing code for wireless communication at a UE, the code comprising instructions executable by a processor to perform a method of any of aspects 1 through 15.

Aspect 34: An apparatus for wireless communication at a network entity, comprising a processor; memory coupled with the processor; and instructions stored in the memory and executable by the processor to cause the apparatus to perform a method of any of aspects 16 through 30.

Aspect 35: An apparatus for wireless communication at a network entity, comprising at least one means for performing a method of any of aspects 16 through 30.

Aspect 36: A non-transitory computer-readable medium storing code for wireless communication at a network entity, the code comprising instructions executable by a processor to perform a method of any of aspects 16 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers.

Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
  one or more processors;
  memory coupled with the one or more processors; and
  instructions stored in the memory and executable by the one or more processors to cause the apparatus to:
    receive, from a network entity, control signaling that is indicative of one or more codebook parameters usable by the UE for generating channel state information reports that include multiple channel quality indicators, the control signaling further indicating a set of resources that span a set of time resources in a time domain and a set of frequency resources in a frequency domain;

receive, from the network entity, a set of reference signals within the set of resources;

perform measurements for the set of reference signals based at least in part on the one or more codebook parameters;

generate a channel state information report for the set of resources based at least in part on the measurements, the channel state information report comprising a plurality of channel quality indicators that are collectively associated with a plurality of time intervals within the set of time resources and one or more of a plurality of frequency bands within the set of frequency resources, wherein a quantity of the plurality of time intervals is based at least in part on a first codebook parameter of the one or more codebook parameters and a quantity of the plurality of channel quality indicators is based at least in part on the first codebook parameter of the one or more codebook parameters; and transmit the channel state information report to the network entity.

2. The apparatus of claim 1, wherein the instructions to transmit the channel state information report are executable by the processor to cause the apparatus to:

transmit the channel state information report comprising a reference channel quality indicator of the plurality of channel quality indicators, wherein a remaining set of channel quality indicators of the plurality of channel quality indicators comprise differential channel quality indicators indicating differences in channel quality relative to the reference channel quality indicator.

3. The apparatus of claim 2, wherein the reference channel quality indicator comprises an average channel quality indicator associated with the plurality of time intervals, the plurality of frequency bands, or both.

4. The apparatus of claim 2, wherein the reference channel quality indicator is associated with an initial time interval of the plurality of time intervals, an initial frequency band of the plurality of frequency bands, or both.

5. The apparatus of claim 2, wherein the reference channel quality indicator comprises a highest channel quality indicator of the plurality of channel quality indicators, a lowest channel quality indicator of the plurality of channel quality indicators, or both.

6. The apparatus of claim 2, wherein the instructions are further executable by the processor to cause the apparatus to:

receive, via the control signaling, an indication of one or more conditions for selecting the reference channel quality indicator, wherein generating the channel state information report is based at least in part on the one or more conditions.

7. The apparatus of claim 1, wherein the instructions to generate the channel state information report are executable by the processor to cause the apparatus to:

generate the channel state information report in accordance with an interpolation function that maps the plurality of channel quality indicators to a subset of time intervals within the plurality of time intervals, to a subset of frequency bands within the plurality of frequency bands, or both.

8. The apparatus of claim 7, wherein the instructions are further executable by the processor to cause the apparatus to:

receive, via the control signaling, an indication of the interpolation function, wherein generating the channel state information report is based at least in part on receiving the indication of the interpolation function.

9. The apparatus of claim 7, wherein the instructions are further executable by the processor to cause the apparatus to:

transmit, via the channel state information report, an indication of the interpolation function used by the UE to generate the channel state information report.

10. The apparatus of claim 1, wherein the one or more codebook parameters comprise a size of a codebook associated with channel state information reporting, a quantity of time-domain bases associated with the channel state information report, a type of bases associated with the channel state information report, or any combination thereof.

11. The apparatus of claim 1, wherein the instructions are further executable by the one or more processors to cause the apparatus to:

receive, via the control signaling, an indication of a length of the set of time resources in the time domain, a quantity of time intervals included within the plurality of time intervals of the set of time resources, or both, wherein the one or more codebook parameters comprise the length, the quantity of time intervals, or both.

12. The apparatus of claim 1, wherein the instructions are further executable by the processor to cause the apparatus to:

transmit a first portion of the channel state information report comprising a first subset of channel quality indicators of the plurality of channel quality indicators; and transmit a second portion of the channel state information report comprising a second subset of channel quality indicators of the plurality of channel quality indicators, wherein the first subset of channel quality indicators and the second subset of channel quality indicators are determined in accordance with one or more priority rules.

13. The apparatus of claim 12, wherein the instructions are further executable by the processor to cause the apparatus to:

receive, via the control signaling, an indication of the one or more priority rules, wherein generating the channel state information report is based at least in part on receiving the indication of the one or more priority rules.

14. The apparatus of claim 1, wherein the instructions are further executable by the one or more processors to cause the apparatus to:

receive scheduling information for one or more communications between the UE and the network entity based at least in part on the channel state information report; and perform the one or more communications with the network entity based at least in part on the scheduling information.

15. An apparatus for wireless communication at a network entity, comprising:

one or more processors;

memory coupled with the one or more processors; and instructions stored in the memory and executable by the one or more processors to cause the apparatus to:

transmit, to a user equipment (UE), control signaling that is indicative of one or more codebook parameters usable by the UE for generating channel state information reports that include multiple channel quality indicators, the control signaling further indicating a set of resources that span a set of time resources in a time domain and a set of frequency resources in a frequency domain;

transmit, to the UE, a set of reference signals within the set of resources; and receive a channel state information report for the set of resources based at least in part on the set of reference signals, the channel state information report comprising a plurality of channel quality indicators that are collectively associated with a plurality of time intervals within the set of time resources and one or more of a plurality of frequency bands within the set of frequency resources, wherein a quantity of the plurality of time intervals is based at least in part on a first codebook parameter of the one or more codebook parameters and a quantity of the plurality of channel quality indicators is based at least in part on the first codebook parameter of the one or more codebook parameters.

16. The apparatus of claim 15, wherein the instructions to receive the channel state information report are executable by the processor to cause the apparatus to:

receive the channel state information report comprising a reference channel quality indicator of the plurality of channel quality indicators, wherein a remaining set of channel quality indicators of the plurality of channel quality indicators comprise differential channel quality indicators indicating differences in channel quality relative to the reference channel quality indicator.

17. The apparatus of claim 16, wherein the reference channel quality indicator comprises an average channel quality indicator associated with the plurality of time intervals, the plurality of frequency bands, or both.

18. The apparatus of claim 16, wherein the reference channel quality indicator is associated with an initial time interval of the plurality of time intervals, an initial frequency band of the plurality of frequency bands, or both.

19. The apparatus of claim 16, wherein the reference channel quality indicator comprises a highest channel quality indicator of the plurality of channel quality indicators, a lowest channel quality indicator of the plurality of channel quality indicators, or both.

20. The apparatus of claim 16, wherein the instructions are further executable by the processor to cause the apparatus to:

transmit, via the control signaling, an indication of one or more conditions for selecting the reference channel quality indicator, wherein receiving the channel state information report is based at least in part on the one or more conditions.

21. The apparatus of claim 15, wherein the channel state information report is based at least in part on an interpolation function that maps the plurality of channel quality indicators to a subset of time intervals within the plurality of time intervals, to a subset of frequency bands within the plurality of frequency bands, or both.

22. The apparatus of claim 21, wherein the instructions are further executable by the processor to cause the apparatus to:

transmit, via the control signaling, an indication of the interpolation function, wherein receiving the channel state information report is based at least in part on transmitting the indication of the interpolation function.

23. The apparatus of claim 21, wherein the instructions are further executable by the processor to cause the apparatus to:

receive, via the channel state information report, an indication of the interpolation function used by the UE to generate the channel state information report.

24. The apparatus of claim 15, wherein the one or more codebook parameters comprise a size of a codebook associated with channel state information reporting, a quantity of time-domain bases associated with the channel state information report, a type of bases associated with the channel state information report, or any combination thereof.

25. The apparatus of claim 15, wherein the instructions are further executable by the one or more processors to cause the apparatus to:

transmit, via the control signaling, an indication of a length of the set of time resources in the time domain, a quantity of time intervals included within the plurality of time intervals of the set of time resources, or both, wherein the one or more codebook parameters comprise the length, the quantity of time intervals, or both.

26. The apparatus of claim 15, wherein the instructions are further executable by the one or more processors to cause the apparatus to:

determine one or more instantaneous channel quality indicators associated with the plurality of time intervals, the plurality of frequency bands, or both, based at least in part on the plurality of channel quality indicators included within the channel state information report;

transmit scheduling information for one or more communications between the UE and the network entity based at least in part on the one or more instantaneous channel quality indicators; and perform the one or more communications with the UE based at least in part on the scheduling information.

27. A method for wireless communication at a user equipment (UE), comprising:

receiving, from a network entity, control signaling that is indicative of one or more codebook parameters usable by the UE for generating channel state information reports that include multiple channel quality indicators, the control signaling further indicating a set of resources that span a set of time resources in a time domain and a set of frequency resources in a frequency domain;

receiving, from the network entity, a set of reference signals within the set of resources;

performing measurements for the set of reference signals based at least in part on the one or more codebook parameters;

generating a channel state information report for the set of resources based at least in part on the measurements, the channel state information report comprising a plurality of channel quality indicators that are collectively associated with a plurality of time intervals within the set of time resources and one or more of a plurality of frequency bands within the set of frequency resources, wherein a quantity of the plurality of time intervals is based at least in part on a first codebook parameter of the one or more codebook parameters and a quantity of the plurality of channel quality indicators is based at least in part on the first codebook parameter of the one or more codebook parameters; and transmitting the channel state information report to the network entity.

28. A method for wireless communication at a network entity, comprising:

transmitting, to a user equipment (UE), control signaling that is indicative of one or more codebook parameters usable by the UE for generating channel state information reports that include multiple channel quality indicators, the control signaling further indicating a set of resources that span a set of time resources in a time domain and a set of frequency resources in a frequency domain;

transmitting, to the UE, a set of reference signals within the set of resources; and receiving a channel state information report for the set of resources based at least in part on the set of reference signals, the channel state information report comprising a plurality of channel quality indicators that are collectively associated with a plurality of time intervals within the set of time resources and one or more of a plurality of frequency bands within the set of frequency resources, wherein a quantity of the plurality of time intervals is based at least in part on a first codebook parameter of the one or more codebook parameters and a quantity of the plurality of channel quality indicators is based at least in part on the first codebook parameter of the one or more codebook parameters.

\* \* \* \* \*